US010121161B2

(12) United States Patent
    Parris

(10) Patent No.: US 10,121,161 B2
(45) Date of Patent: Nov. 6, 2018

(54) SYSTEMS, METHODS, AND COMPUTER PROGRAM PRODUCTS PROVIDING A YIELD MANAGEMENT TOOL THAT ENHANCES VISIBILITY OF RECOVERY RATES OF RECOVERED AND DISPOSED ASSETS

(71) Applicant: United Parcel Service of America, Inc., Atlanta, GA (US)

(72) Inventor: Carrie Parris, Seattle, WA (US)

(73) Assignee: United Parcel Service of America, Inc., Atlanta, GA (US)

(*) Notice: Subject to any disclaimer, the term of this patent is extended or adjusted under 35 U.S.C. 154(b) by 649 days.

(21) Appl. No.: 14/568,756

(22) Filed: Dec. 12, 2014

(65) Prior Publication Data
    US 2015/0235248 A1    Aug. 20, 2015

Related U.S. Application Data

(60) Provisional application No. 61/939,833, filed on Feb. 14, 2014, provisional application No. 61/940,056, filed on Feb. 14, 2014.

(51) Int. Cl.
    *G06Q 30/02* (2012.01)
    *G06Q 10/06* (2012.01)

(52) U.S. Cl.
    CPC ... *G06Q 30/0206* (2013.01); *G06Q 10/06315* (2013.01)

(58) Field of Classification Search
    None
    See application file for complete search history.

(56) References Cited

U.S. PATENT DOCUMENTS

2007/0050274 A1* 3/2007 Rogatz ............... G06Q 40/00
                                                              705/35
2007/0208646 A1* 9/2007 Treacy, Jr. .......... G06Q 40/00
                                                            705/36 T

OTHER PUBLICATIONS

Berman, Evan, Public Administration and Public Policy, 2009, Auerbach Publications (Year: 2009).*

* cited by examiner

*Primary Examiner* — Matthew S Gart
*Assistant Examiner* — Amanda Gurski
(74) *Attorney, Agent, or Firm* — Shook, Hardy & Bacon L.L.P.

(57) ABSTRACT

A yield management system for dynamically enhancing visibility of yield rates realized for one or more recovered assets is provided. The system is configured to retrieve disposition data associated with a plurality of activities undertaken with handling and processing of one or more recovered assets for disposal thereof and comprising at least one component of disposition cost. Based thereon the system calculates a yield rate for each of said one or more recovered assets, compares said calculated yield rate to one or more market yield rates to identify one or more discrepancies, and if discrepancies exist, generate an indication thereof. A conservation logistics system is also provided, which calculates an index value along a consolidated index scale, compares said index value to one or more predetermined goals so as to identify one or more discrepancies, and if discrepancies exist, facilitates implementation of one or more conservation logistics initiatives.

22 Claims, 17 Drawing Sheets

| Visibility Report for Recovery Rate Yield Management | Apparel | Shoes | Health/Beauty | High Tech | Sports |
|---|---|---|---|---|---|
| < $50 | 25% / Y | 14% / R | 59% / G | 27% / Y | 41% / G |
| $50 - $100 | 12% / R | 57% / G | 32% / Y | 49% / G | 18% / R |
| $100 - $250 | 17% / R | 24% / R | 15% / R | 37% / G | 22% / Y |
| $250 - $500 | 45% / G | 32% / G | 24% / R | 12% / R | 10% / R |
| > $500 | 29% / Y | 19% / R | 55% / G | 41% / G | 31% / Y |

**talk about color blocks in spec

*FIG. 11*

UNIFORM INTERNAL CONSERVATION LOGISTICS INDEX

| Very Lt | Very Lt to Lt | Lt | Lt to Mod | Mod | Mod to Sev | Sev | Sev to Ex | Ex | Ex Plus |
|---|---|---|---|---|---|---|---|---|---|
| >0 to 9 | 10 to 19 | 20 to 29 | 30 to 39 | 40 to 49 | 50 to 59 | 60 to 69 | 70 to 79 | 80 to 89 | 90 to 99 |
| Light Blue | Dark Blue | Light Green | Dark Green | Yellow | Orange | Pink | Red | Maroon | Black |

UNIFORM EXTERNAL CONSERVATION LOGISTICS INDEX

| Very Lt | Very Lt to Lt | Lt | Lt to Mod | Mod | Mod to Sev | Sev | Sev to Ex | Ex | Ex Plus |
|---|---|---|---|---|---|---|---|---|---|
| >0 to 9 | 10 to 19 | 20 to 29 | 30 to 39 | 40 to 49 | 50 to 59 | 60 to 69 | 70 to 79 | 80 to 89 | 90 to 99 |
| Light Blue | Dark Blue | Light Green | Dark Green | Yellow | Orange | Pink | Red | Maroon | Black |
| 10 | 20 | 30 | 40 | 50 | 60 | 70 | 80 | 90 | |

SYSTEMS, METHODS, AND COMPUTER PROGRAM PRODUCTS PROVIDING A YIELD MANAGEMENT TOOL THAT ENHANCES VISIBILITY OF RECOVERY RATES OF RECOVERED AND DISPOSED ASSETS

CROSS-REFERENCE TO RELATED APPLICATIONS

This application claims priority to and the benefit of U.S. Provisional Patent Application Ser. No. 61/939,833, filed Feb. 14, 2014, and U.S. Provisional Patent Application Ser. No. 61/940,056, filed Feb. 14, 2014, the contents of both of which as are hereby incorporated by reference in their entirety.

BACKGROUND

Conventional yield management models lack an enhanced degree of visibility that oftentimes prevents companies, individuals, entities, and the like (e.g., users or customers of particular systems and such models) from efficiently and effectively making decisions concerning disposition routes for recovered assets and/or commodity items. Where such decisions are either unmonitored or monitored with only a minimal degree of visibility, recovery rates and thus yields upon disposal of recovered assets or commodity items (e.g., recycling, refurbishment, resale, or the like of the same) may suffer or remain less than optimal. Thus, a need exists for an integrated platform that consolidates all facets of the disposal and disposition process for recovered assets and commodity items, so as to improve the efficiency and accuracy thereof, in particular with respect to maximizing end-result yield and/or recovery rates. A need further exists for an associated tool for comparing results against market norms or trends and/or mapping the same against simulation models or tools for futuristic projections, thus facilitating proactive yield management versus reactive yield management efforts.

BRIEF SUMMARY

According to various embodiments, a yield management system for dynamically enhancing visibility of yield rates realized for one or more recovered assets or commodity items upon disposition thereof is provided. The system comprises one or more memory storage areas containing market data identifying one or more market yield rates for various recovered assets or commodity items and one or more computer processors. The computer processors are configured to: receive input data associated with the one or more holders of the one or more recovered assets or commodity items and comprising at least an initial value and a disposition value of the one or more assets or commodity items; retrieve disposition data associated with a plurality of activities undertaken with handling and processing of the one or more recovered assets or commodity items for disposal thereof and comprising at least one component of disposition cost; calculate a yield rate for each of the one or more recovered assets or commodity items, the calculation being based at least in part upon the initial value, the disposition value, and the disposition costs; compare the calculated yield rate to the one or more market yield rates to identify one or more discrepancies there-between; and in response to identifying the one or more discrepancies, generate and transmit an indication thereof to at least one user of the system so as to dynamically enhance visibility of the calculated yield rate relative to the one or more market yield rates.

According to various embodiments, a computer-implemented method for dynamically enhancing visibility of yield rates realized for one or more recovered assets or commodity items upon disposition thereof is provided. The method comprises the step of: receiving and storing within one or more memory storage areas: market data identifying one or more market yield rates for various recovered assets or commodity items; input data associated with the one or more holders of the one or more recovered assets or commodity items and comprising at least an initial value and a disposition value of the one or more assets or commodity items; and disposition data associated with a plurality of activities undertaken with handling and processing of the one or more recovered assets or commodity items for disposal thereof and comprising at least one component of disposition cost. The method further comprises the steps of: calculating, via at least one computer processor, a yield rate for each of the one or more recovered assets or commodity items, the calculation being based at least in part upon the initial value, the disposition value, and the disposition costs; comparing, via the at least one computer processor, the calculated yield rate to the one or more market yield rates to identify one or more discrepancies there-between; and in response to identifying the one or more discrepancies, generating and transmitting, via the at least one computer processor, an indication thereof to at least one user of the system so as to dynamically enhance visibility of the calculated yield rate relative to the one or more market yield rates.

According to various embodiments, a non-transitory computer program product comprising at least one computer-readable storage medium having computer-readable program code portions embodied therein is provided. The computer-readable program code portions comprise: an executable portion configured for receiving a plurality of data, wherein the data comprises: market data identifying one or more market yield rates for various recovered assets or commodity items; input data associated with the one or more holders of the one or more recovered assets or commodity items and comprising at least an initial value and a disposition value of the one or more assets or commodity items; and disposition data associated with a plurality of activities undertaken with handling and processing of the one or more recovered assets or commodity items for disposal thereof and comprising at least one component of disposition cost. The computer-readable program code portions further comprise: an executable portion configured for calculating a yield rate for each of the one or more recovered assets or commodity items, the calculation being based at least in part upon the initial value, the disposition value, and the disposition costs; an executable portion configured for, in response to calculating the yield rate, comparing the calculated yield rate to the one or more market yield rates to identify one or more discrepancies there-between; and an executable portion configured for, in response to identifying the one or more discrepancies, generating and transmitting, via the at least one computer processor, an indication thereof to at least one user of the system so as to dynamically enhance visibility of the calculated yield rate relative to the one or more market yield rates.

A conservation logistics system for dynamically managing consumption across a logistics network, said system comprising: one or more memory storage areas containing a consolidated conservation logistics index scale and one or more pre-determined and index-scaled goals; and one or more computer processors. The one or more computer processors are configured to: receive input data associated with consumption of at least one of energy, water, or natural resources, said input data comprising consumption data for a carrier and for one or more parties other than the carrier; calculate an index value along said consolidated conservation logistics index scale, said index value being based at least in part upon said received consumption data; compare said calculated index value to said one or more pre-determined and index-scaled goals so as to identify one or more discrepancies there-between; and in response to identifying said one or more discrepancies, generate and transmit an indication thereof to at least one user of said system so as to dynamically facilitate implementation of one or more conservation logistics initiatives, said one or more initiatives being configured for positively influencing said consumption across said logistics network.

According to various embodiments, a computer-implemented method for dynamically managing consumption across a logistics network is provided. The method comprises the step of: receiving and storing within one or more memory storage areas a consolidated conservation logistics index scale and one or more pre-determined and index-scaled goals. The method further comprises the steps of: receiving and storing in one or more memory storage areas, via one or more computer processors, input data associated with consumption of at least one of energy, water, or natural resources, said input data comprising consumption data for a carrier and for one or more parties other than the carrier; calculating, via said one or more computer processors, an index value along said consolidated conservation logistics index scale, said index value being based at least in part upon said received consumption data; comparing, via said one or more computer processors, said calculated index value to said one or more pre-determined and index-scaled goals so as to identify one or more discrepancies there-between; and in response to identifying said one or more discrepancies, generating, via said one or more computer processors, an indication thereof to at least one user of said system so as to dynamically facilitate implementation of one or more conservation logistics initiatives, said one or more initiatives being configured for positively influencing said consumption across said logistics network.

According to various embodiments, a non-transitory computer program product comprising at least one computer-readable storage medium having computer-readable program code portions embodied therein is provided. The computer-readable program code portions comprise: an executable portion configured for receiving and storing in one or more memory storage areas input data associated with consumption of at least one of energy, water, or natural resources, said input data comprising consumption data for a carrier and for one or more parties other than the carrier; an executable portion configured for calculating an index value along said consolidated conservation logistics index scale, said index value being based at least in part upon said received consumption data; an executable portion configured for comparing said calculated index value to said one or more pre-determined and index-scaled goals so as to identify one or more discrepancies there-between; and an executable portion configured for, in response to identifying said one or more discrepancies, generating an indication thereof to at least one user of said system so as to dynamically facilitate implementation of one or more conservation logistics initiatives, said one or more initiatives being configured for positively influencing said consumption across said logistics network.

BRIEF DESCRIPTION OF THE SEVERAL VIEWS OF THE DRAWING(S)

The accompanying drawings incorporated herein and forming a part of the disclosure illustrate several aspects of the present invention and together with the detailed description serve to explain certain principles of the present invention. In the drawings, which are not necessarily drawn to scale:

Figure 1:
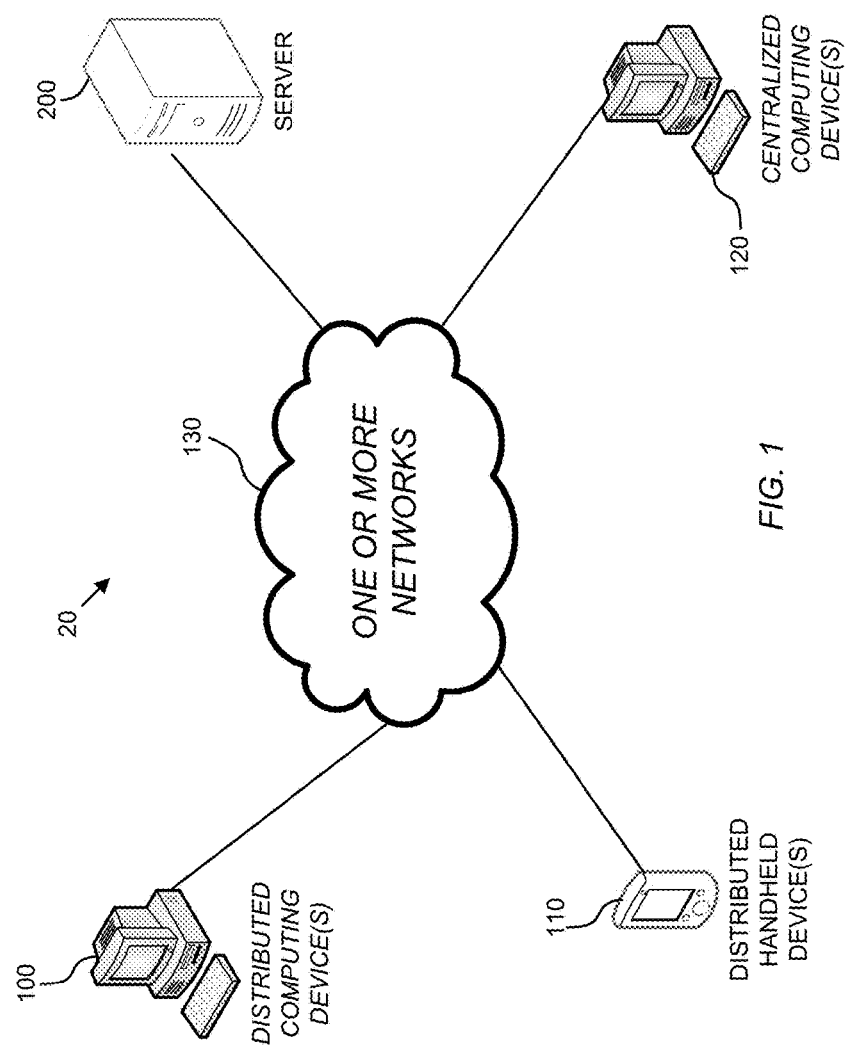
FIG. 1 is a block diagram of a yield management system 20 according to various embodiments.
Figure 2:
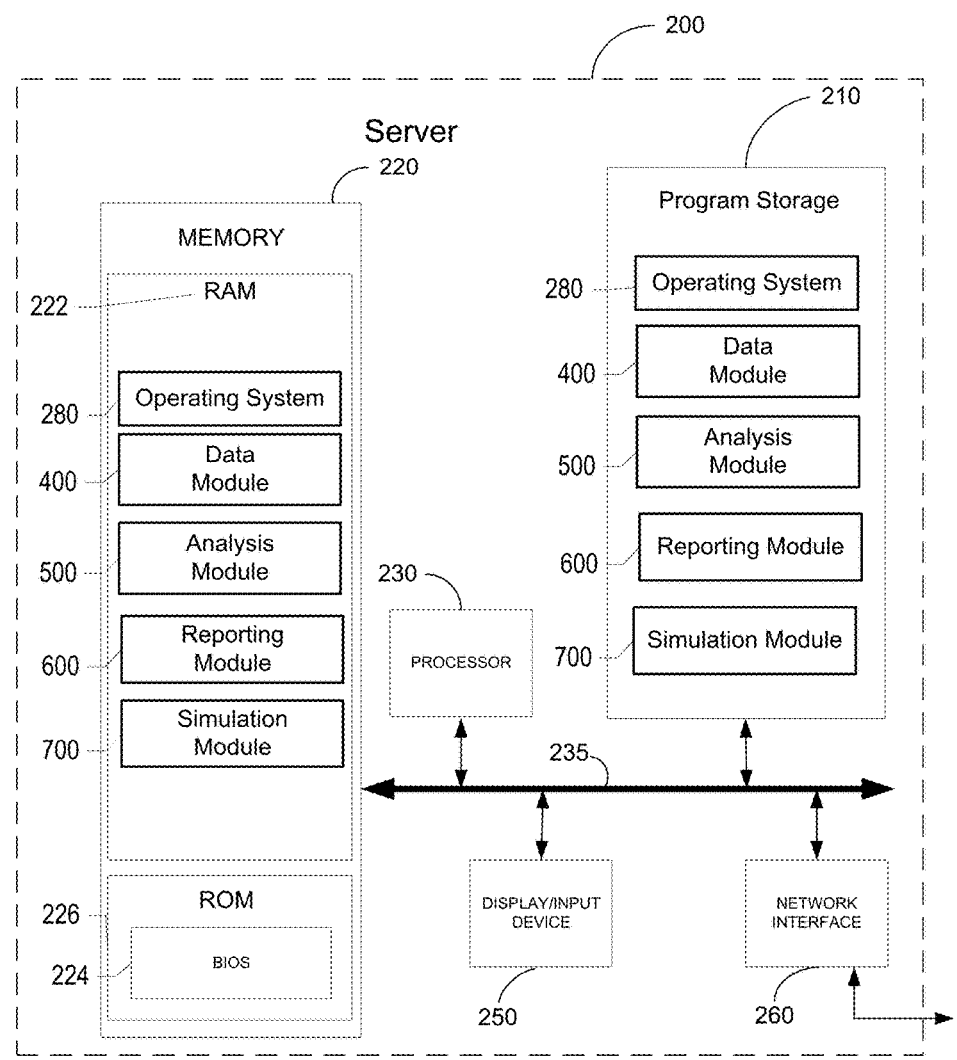
FIG. 2 is schematic block diagram of a yield management server 200 according to various embodiments.
Figure 3:
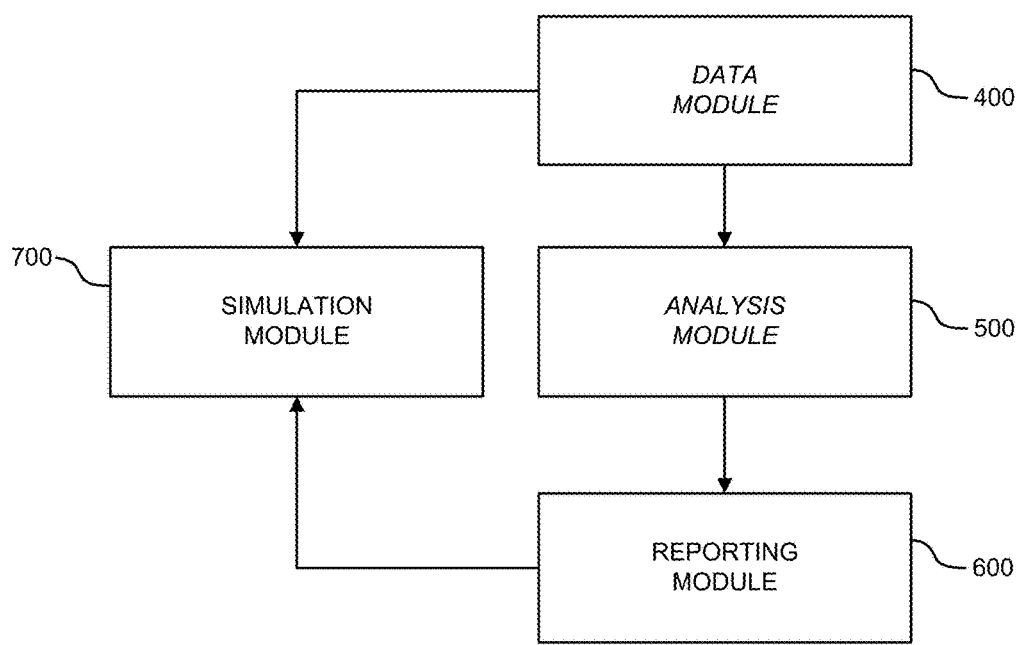
FIG. 3 illustrates an overall process flow for various modules of the yield management server 200 according to various embodiments.
Figure 5:
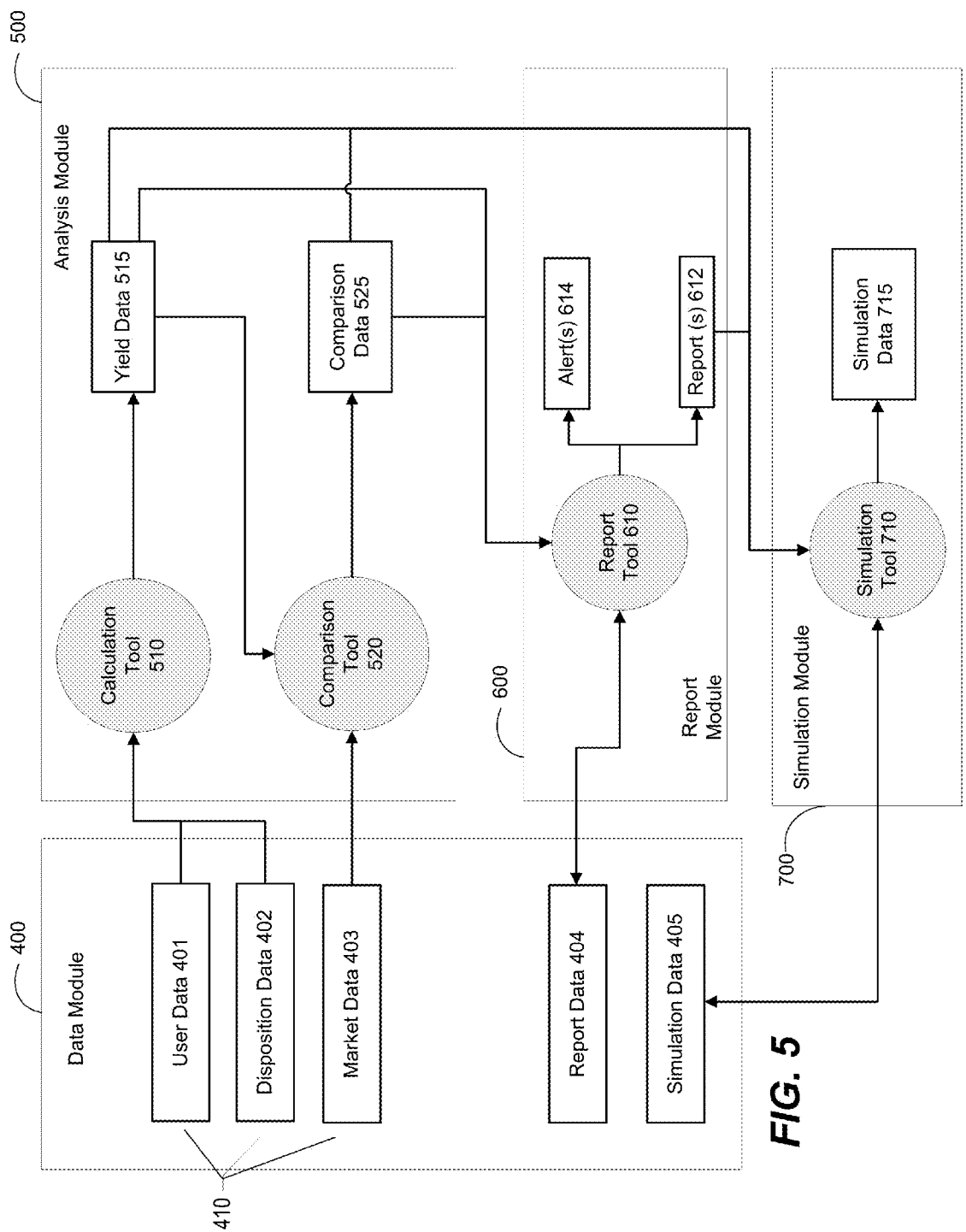
Figure 6:
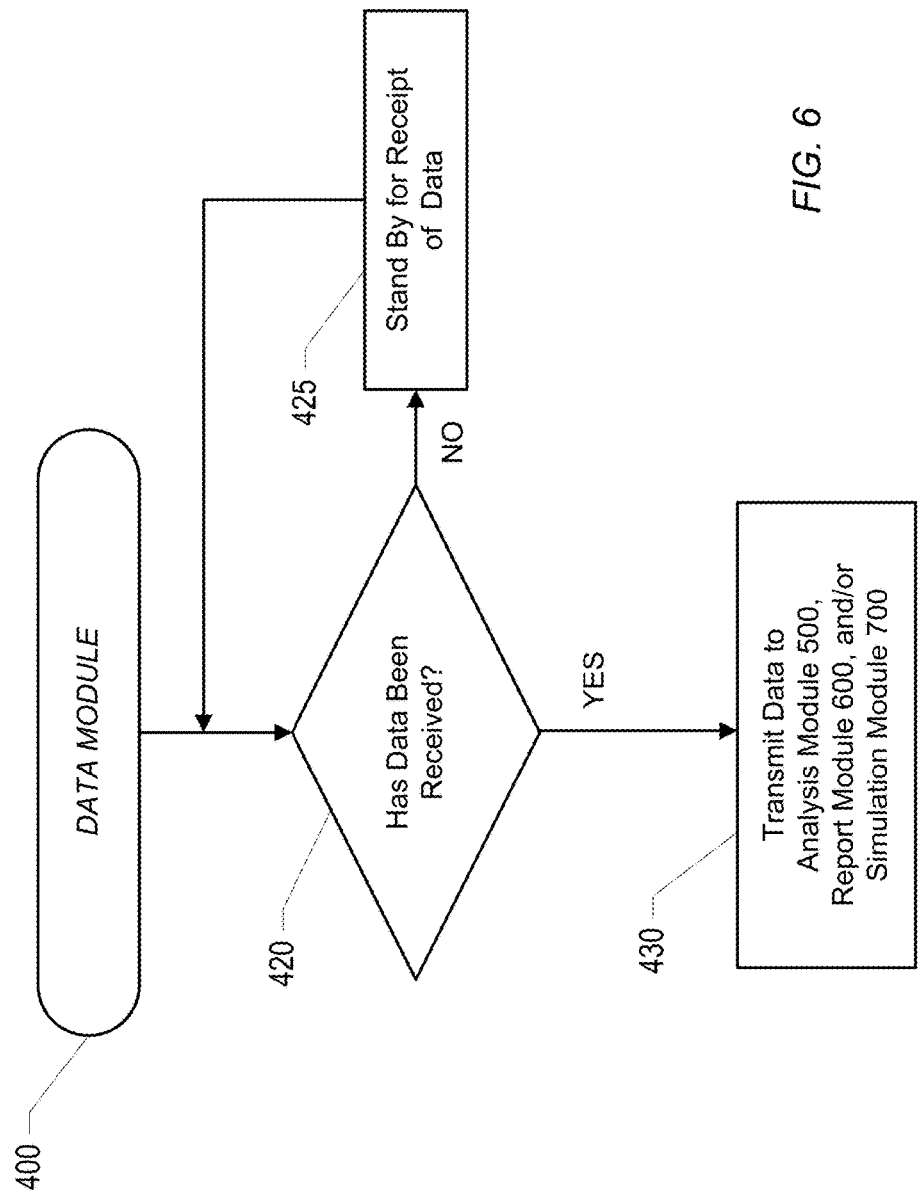
Figure 7:
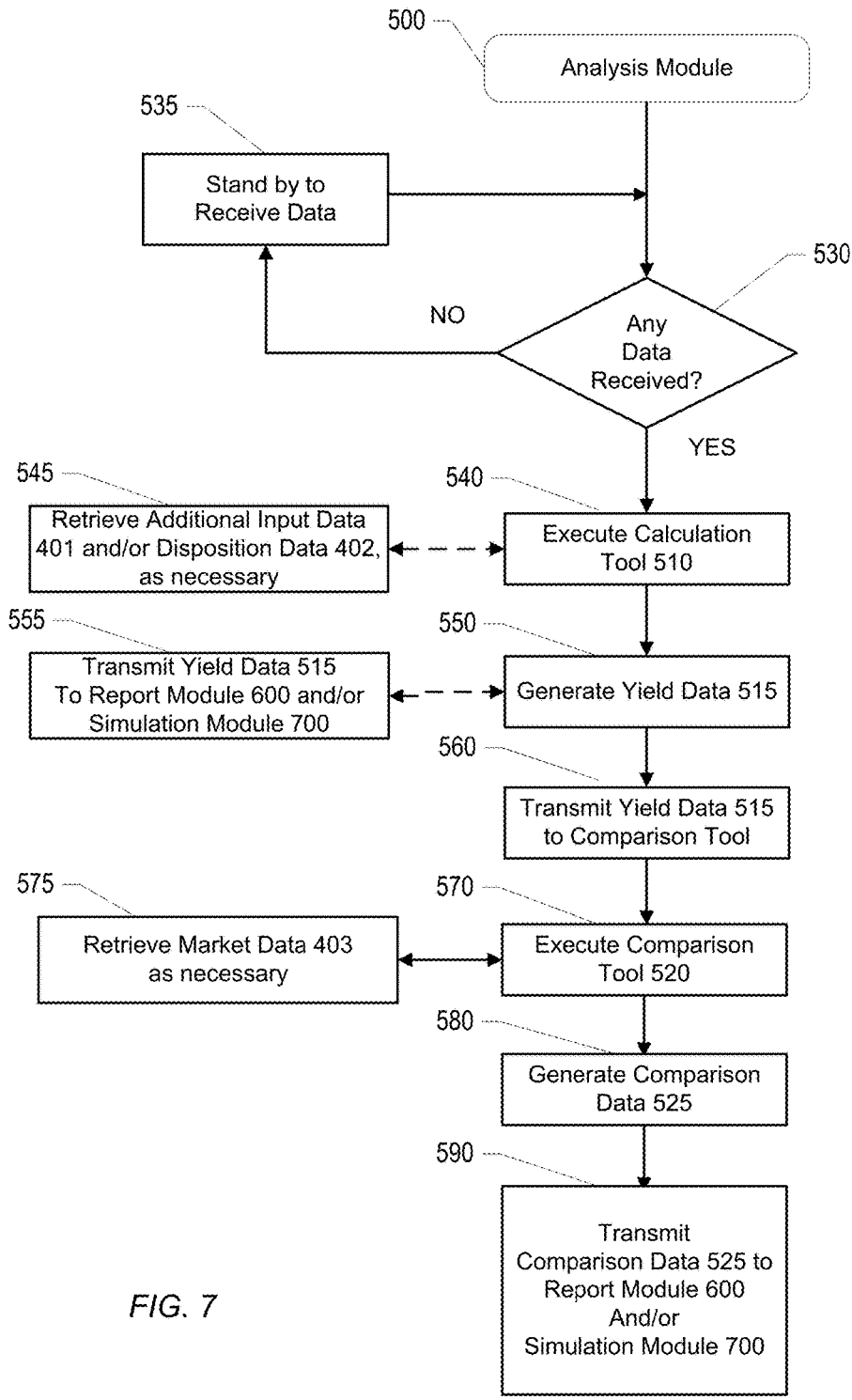
Figure 8:
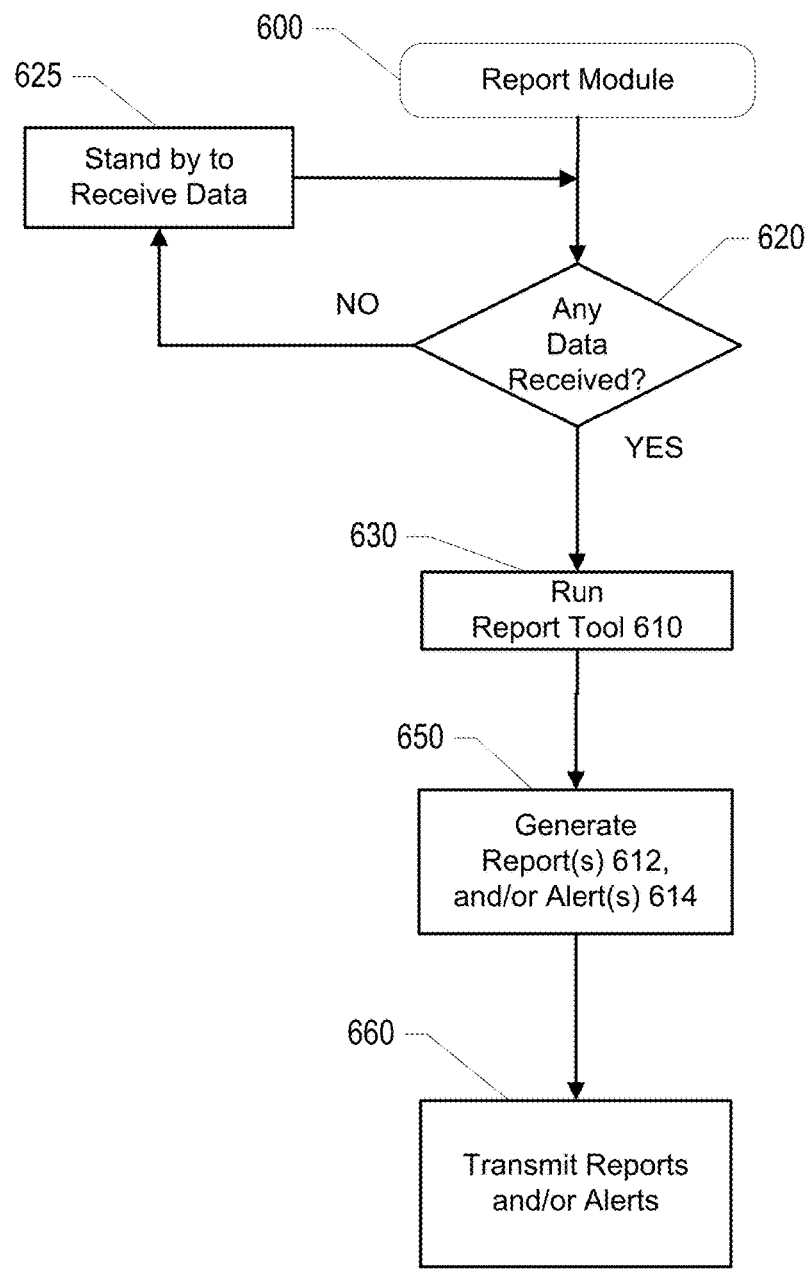
Figure 9:
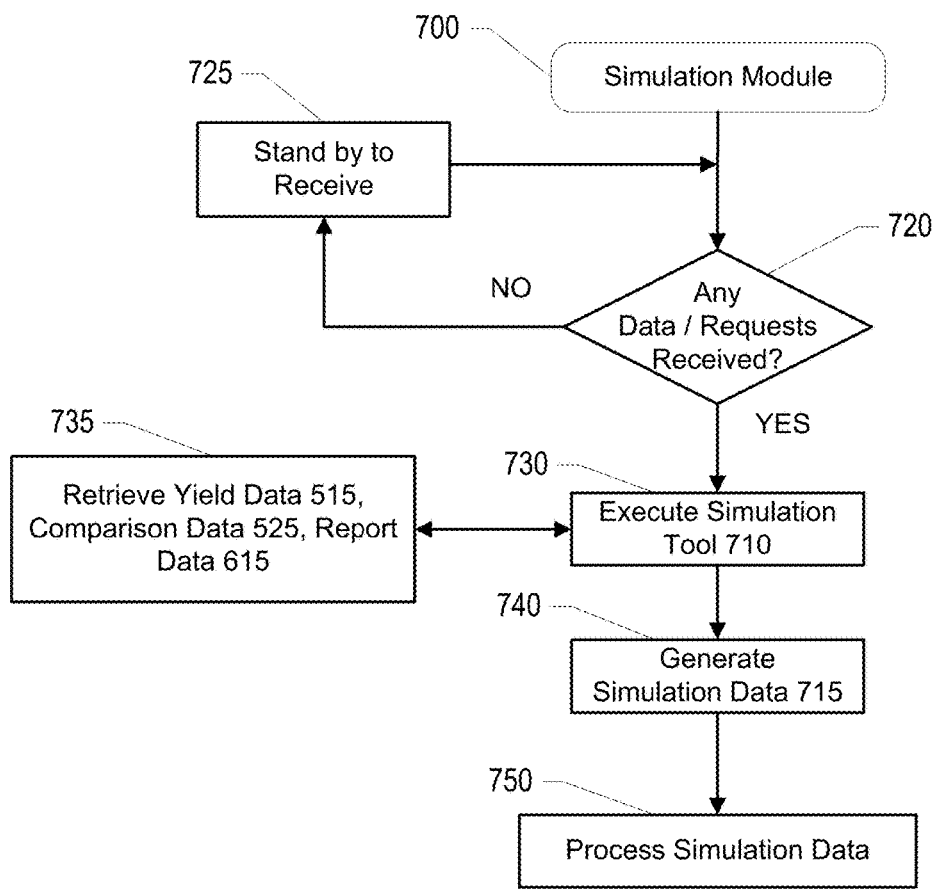
Figure 10:
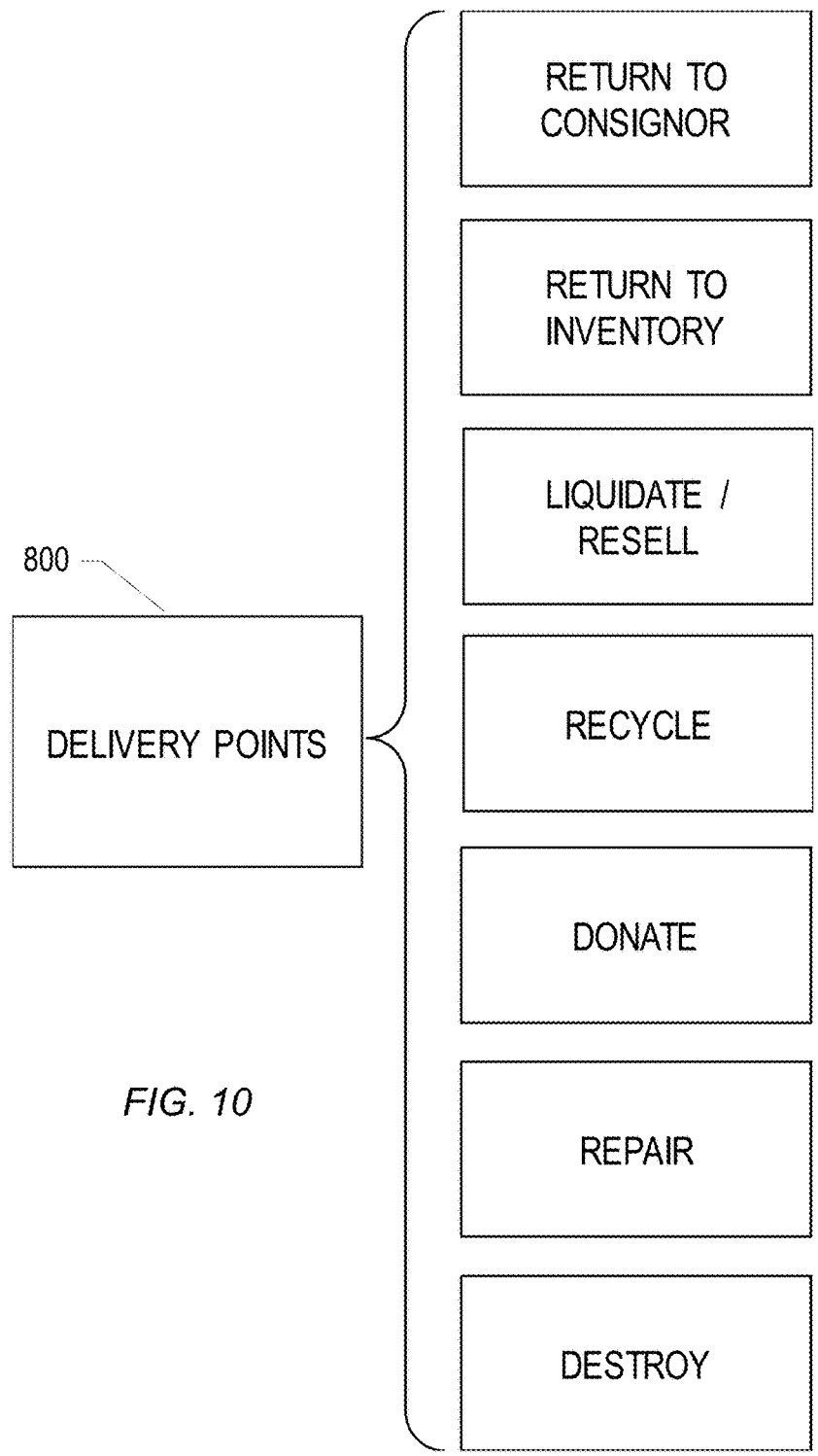
Figure 12:
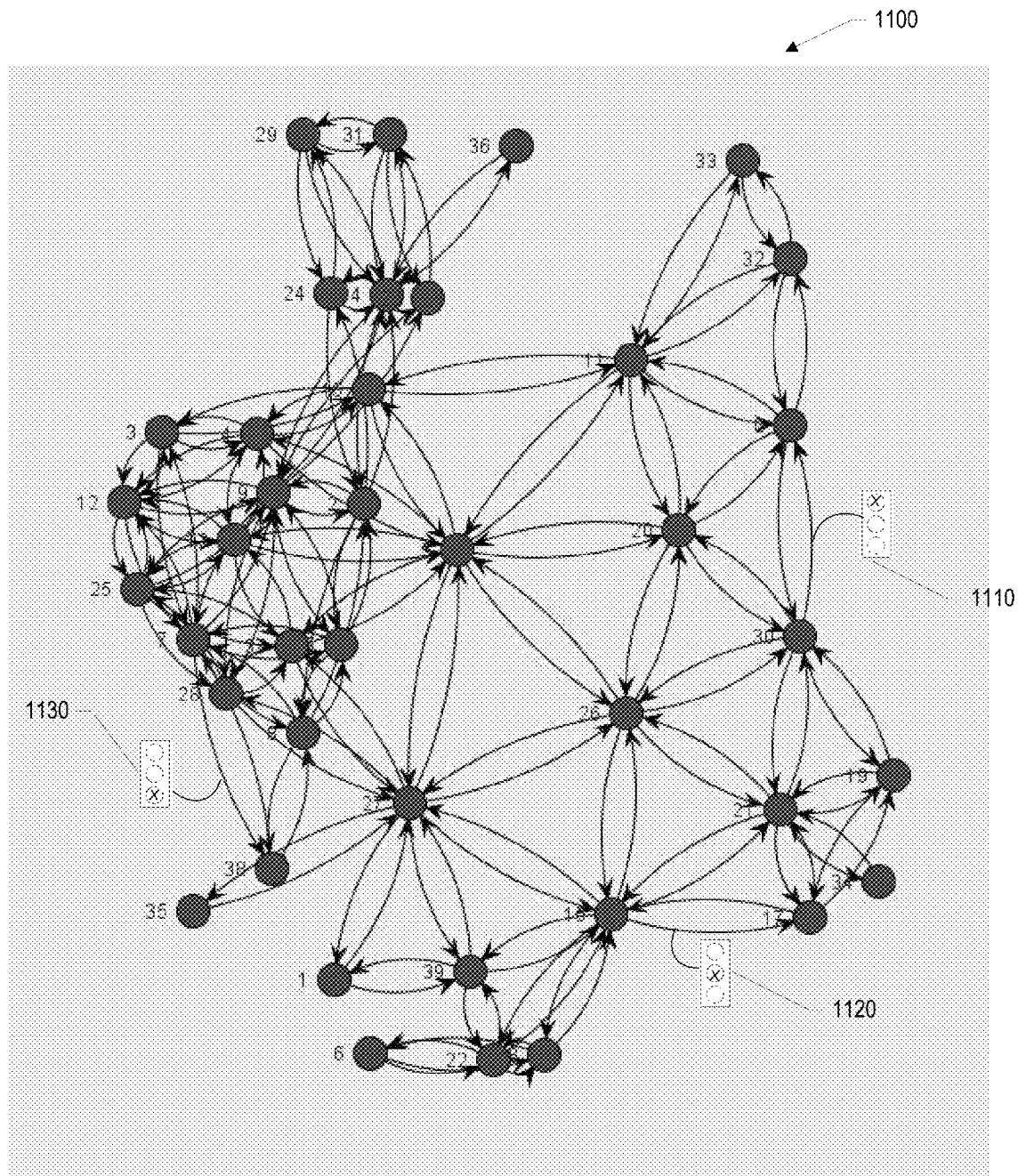
Figure 13:
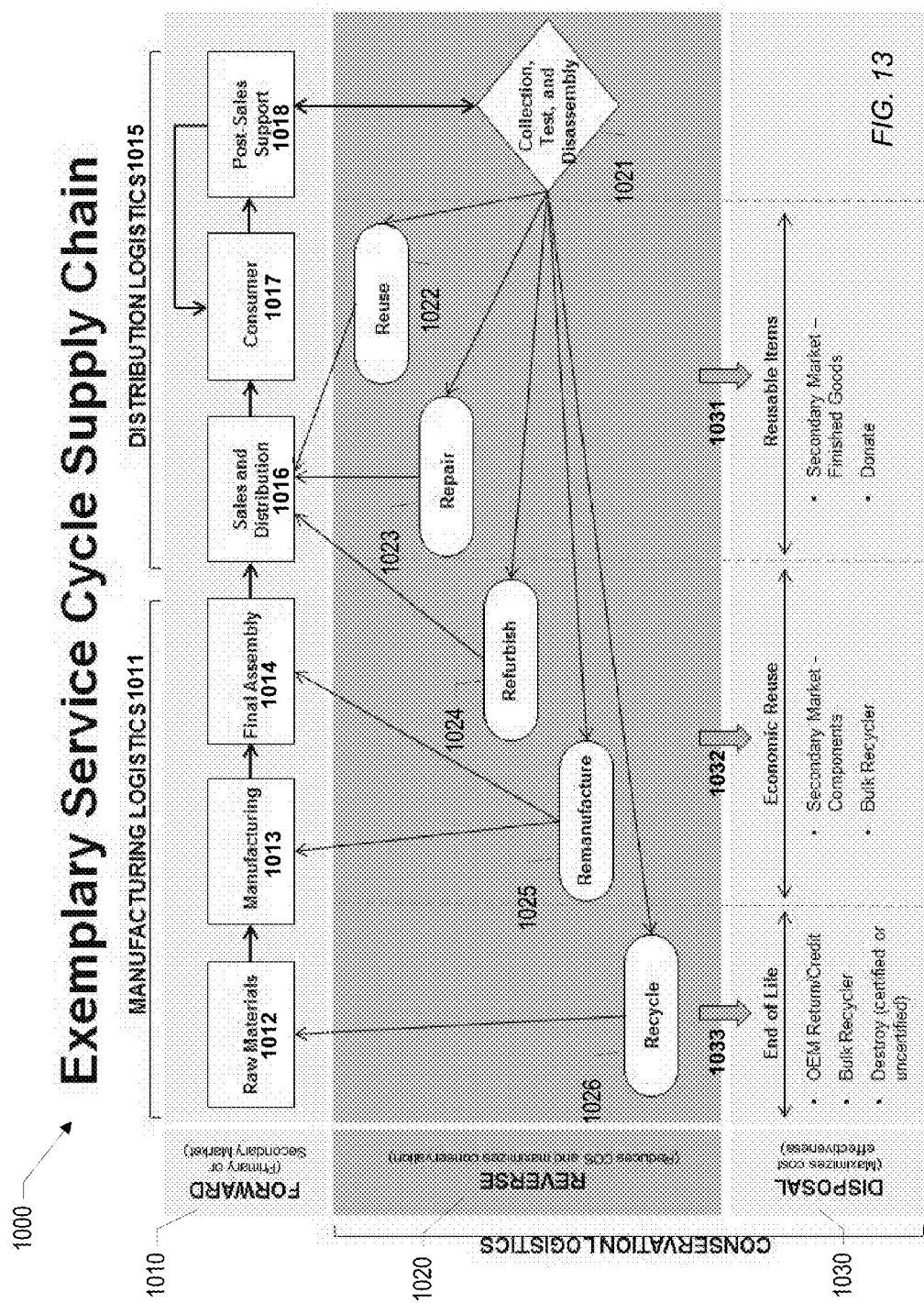
Figure 16:
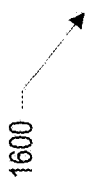
Figure 17:
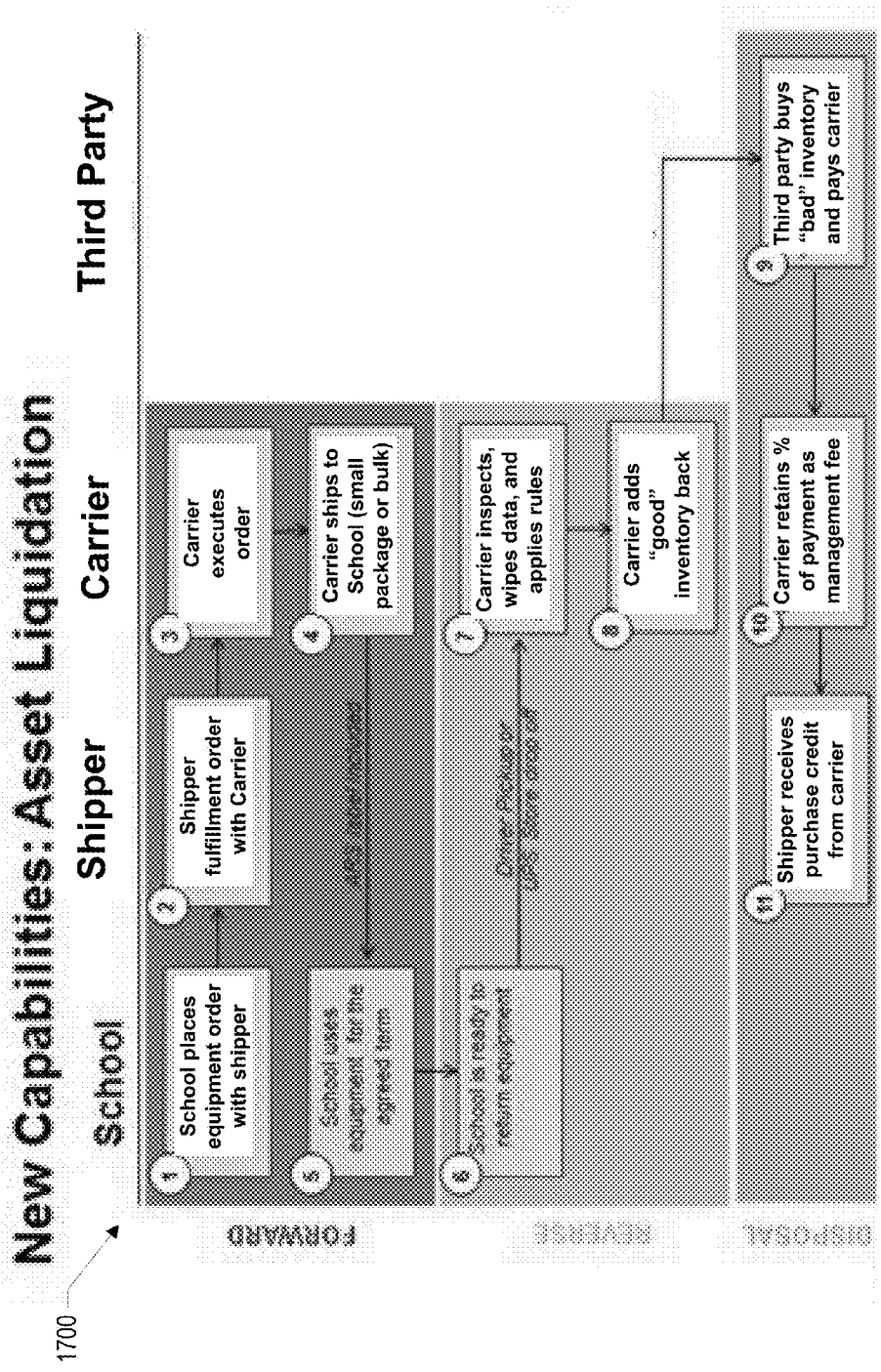

FIG. 5 is a schematic block diagram of a data module 400, an analysis module 500, a report module 600, and a simulation module 700, all as also illustrated in FIGS. 2 and 3 according to various embodiments;

FIG. 6 illustrates an exemplary process flow according to various embodiments for the data module 400 shown in FIGS. 2 and 5;

FIG. 7 illustrates an exemplary process flow according to various embodiments for the analysis module 500 shown in FIGS. 2 and 5;

FIG. 8 illustrates an exemplary process flow according to various embodiments for the report module 600 shown in FIGS. 2 and 5;

FIG. 9 illustrates an exemplary process flow according to various embodiments for the simulation module 700 shown in FIGS. 2 and 5;

FIG. 10 illustrates exemplary available delivery points 800 for disposition of recovered assets according to various embodiments;

FIG. 11 illustrates an exemplary visibility report, as may be generated according to various embodiments via the report module 600 shown in FIGS. 2 and 5;

FIG. 12 illustrates an exemplary simulation data report 1000, as may be generated via various embodiments of the system 20 shown in FIG. 1;

FIG. 13 illustrates an exemplary service cycle supply chain network 1000 with integrated conservation logistics features according to various embodiments;

FIG. 14 illustrates an exemplary uniform internal conservation logistics index 1400 according to various embodiments utilizing the network 1000 of FIG. 13;

FIG. 15 illustrates an exemplary uniform external conservation logistics index 1500 according to various embodiments utilizing the network 1000 of FIG. 13;

FIG. 16 illustrates an exemplary uniform consolidated conservation logistics index 1600 according to various embodiments utilizing the network 1000 of FIG. 13; and FIG. 17 illustrates an exemplary comprehensive conservation logistics scenario, as may be implemented according to various embodiments by utilizing the network 1000 of FIG. 13 and/or the yield management system 20 of FIG. 1.

DETAILED DESCRIPTION OF VARIOUS EMBODIMENTS

Various embodiments of the present invention will now be described more fully hereinafter with reference to the accompanying drawings, in which some, but not all embodiments of the invention are shown. Indeed, embodiments of the invention may be embodied in many different forms and should not be construed as limited to the embodiments set forth herein. Rather, these embodiments are provided so that this disclosure will satisfy applicable legal requirements. Unless otherwise defined, all technical and scientific terms used herein have the same meaning as commonly known and understood by one of ordinary skill in the art to which the invention relates. The term "or" is used herein in both the alternative and conjunctive sense, unless otherwise indicated. Like numbers refer to like elements throughout.

Generally speaking, various embodiments are configured to provide a yield management tool that enhances visibility of recovery rates of recovered and disposed assets. In other words, the systems, methods, and computer program products described herein are configured to assist users thereof with navigation of the decision-making process for what to do with recovered assets once such are received (i.e., returned by customers). Asset disposal options may include handling and processing to various delivery points, such as the non-limiting examples of return of asset to consignor, return of asset to inventory, liquidation or resale of asset, recycling of asset, donation of asset, repair of asset, and/or destruction of asset. For each of the various available asset disposal options, the tool provided by the systems, methods, and computer program products described herein is configured to focus the decision making process primarily upon optimization of yield realized via the asset disposal process, realizing that exceptions may exist for business initiatives (e.g., green initiatives that may be more costly and thus reduce yield, but which are more attractive from a business and/or marketing perspective).

In particular, and as will be described in much further detail elsewhere herein, the tool provided by the systems, methods, and computer program products calculate a presently realized yield based upon certain data input by a user (e.g., wholesale value, MSRP, recovery sale price, and the like) and certain data obtained via a common carrier service provider, as may be responsible for the movement of the recovered asset, including collection, transport, and delivery of the same, however as may be necessary for particular scenarios. Once so calculated, the tool may be configured according to various embodiments to display such yield data (e.g., as a recovery rate value, as may be defined as the recovery sale price minus incurred recovery costs over original sale price or wholesale cost). In various embodiments, the tool may also be configured to further compare the calculated yield data against typical market trend data, whether for similarly situated market users relative to the user being evaluated, or otherwise, as will be described in further detail elsewhere herein. In either scenario, displays may be provided via reports, alerts, or otherwise.

Various embodiments of the systems, methods, and computer program products described herein may still further be configured to provide a simulation tool that interactively models actual yield data against performance metrics and/or user network or infrastructure goals, so as to identify and highlight potential areas for improvement to the networks owned by users of the systems, methods, and computer program products. Additional details in this regard and otherwise, will be provided elsewhere herein.

Apparatuses, Methods, Systems, and Computer Program Products

As should be appreciated, various embodiments may be implemented in various ways, including as apparatuses, methods, systems, or computer program products. Accordingly, the embodiments may take the form of an entirely hardware embodiment, or an embodiment in which a processor is programmed to perform certain steps. Furthermore, various implementations may take the form of a computer program product on a computer-readable storage medium having computer-readable program instructions embodied in the storage medium. In such embodiments, any suitable computer-readable storage medium may be utilized including hard disks, CD-ROMs, optical storage devices, or magnetic storage devices.

Various embodiments are described below with reference to block diagrams and flowchart illustrations of apparatuses, methods, systems, and computer program products. It should be understood that each block of any of the block diagrams and flowchart illustrations, respectively, may be implemented in part by computer program instructions, e.g., as logical steps or operations executing on a processor in a computing system. These computer program instructions may be loaded onto a computer, such as a special purpose computer or other programmable data processing apparatus to produce a specifically-configured machine, such that the instructions which execute on the computer or other programmable data processing apparatus implement the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the functionality specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide operations for implementing the functions specified in the flowchart block or blocks.

Accordingly, blocks of the block diagrams and flowchart illustrations support various combinations for performing the specified functions, combinations of operations for performing the specified functions and program instructions for performing the specified functions. It should also be understood that each block of the block diagrams and flowchart illustrations, and combinations of blocks in the block diagrams and flowchart illustrations, could be implemented by special purpose hardware-based computer systems that perform the specified functions or operations, or combinations of special purpose hardware and computer instructions.

Exemplary System Architecture

FIG. 1 is a block diagram of a yield management system 20 that can be used in conjunction with various embodiments of the present invention. In at least the illustrated embodiment, the system 20 may include one or more distributed computing devices 100, one or more distributed handheld devices 110, and one or more central computing devices 120, each configured in communication with a yield management server 200 via one or more networks 130. While FIG. 1 illustrates the various system entities as separate, standalone entities, the various embodiments are not limited to this particular architecture.

According to various embodiments of the present invention, the one or more networks 130 may be capable of supporting communication in accordance with any one or more of a number of second-generation (2G), 2.5G, third-generation (3G), and/or fourth-generation (4G) mobile communication protocols, or the like. More particularly, the one or more networks 130 may be capable of supporting communication in accordance with 2G wireless communication protocols IS-136 (TDMA), GSM, and IS-95 (CDMA). Also, for example, the one or more networks 130 may be capable of supporting communication in accordance with 2.5G wireless communication protocols GPRS, Enhanced Data GSM Environment (EDGE), or the like. In addition, for example, the one or more networks 130 may be capable of supporting communication in accordance with 3G wireless communication protocols such as Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present invention, as should dual or higher mode mobile stations (e.g., digital/analog or TDMA/CDMA/analog phones). As yet another example, each of the components of the system 20 may be configured to communicate with one another in accordance with techniques such as, for example, radio frequency (RF), Bluetooth™, infrared (IrDA), or any of a number of different wired or wireless networking techniques, including a wired or wireless Personal Area Network ("PAN"), Local Area Network ("LAN"), Metropolitan Area Network ("MAN"), Wide Area Network ("WAN"), or the like.

Although the distributed computing device(s) 100, the distributed handheld device(s) 110, the central computing device(s) 120, and the yield management server 200 are illustrated in FIG. 1 as communicating with one another over the same network 130, these devices may likewise communicate over multiple, separate networks. For example, while the central computing devices 120 may communicate with the server 200 over a wireless personal area network (WPAN) using, for example, Bluetooth techniques, one or more of the distributed devices 100, 110 may communicate with the server 200 over a wireless wide area network (WWAN), for example, in accordance with EDGE, or some other 2.5G wireless communication protocol.

According to at least one embodiment, in addition to receiving data from the yield management server 200, the distributed computing devices 100, the distributed handheld devices 110, and the central computing devices 120 may be further configured to collect and transmit data on their own. Indeed, the distributed computing devices 100, the distributed handheld devices 110, and the central computing devices 120 may be any device associated with a carrier (e.g., a common carrier, such as UPS, FedEx, USPS, etc.). In certain embodiments, one or more of the distributed computing devices 100 and the distributed handheld devices 110 may be associated with one or more independent third party users, as opposed to a carrier. Regardless, in various embodiments, the distributed computing devices 100, the distributed handheld devices 110, and the central computing devices 120 may be capable of receiving data via one or more input units or devices, such as a keypad, touchpad, barcode scanner, radio frequency identification (RFID) reader, interface card (e.g., modem, etc.) or receiver. The distributed computing devices 100, the distributed handheld devices 110, and the central computing devices 120 may further be capable of storing data to one or more volatile or non-volatile memory modules, and outputting the data via one or more output units or devices, for example, by displaying data to the user operating the device, or by transmitting data, for example over the one or more networks 130. One type of a distributed handheld device 110, which may be used in conjunction with embodiments of the present invention is the Delivery Information Acquisition Device (DIAD) presently utilized by UPS.

Yield Management Server 200

In various embodiments, the yield management server 200 includes various systems for performing one or more functions in accordance with various embodiments of the present invention, including those more particularly shown and described herein. It should be understood, however, that the server 200 might include a variety of alternative devices for performing one or more like functions, without departing from the spirit and scope of the present invention. For example, at least a portion of the server 200, in certain embodiments, may be located on the distributed computing device(s) 100, the distributed handheld device(s) 110, and the central computing device(s) 120, as may be desirable for particular applications.

FIG. 2 is a schematic diagram of the yield management server 200 according to various embodiments. The server 200 includes a processor 230 that communicates with other elements within the server via a system interface or bus 235. Also included in the server 200 is a display/input device 250 for receiving and displaying data. This display/input device 250 may be, for example, a keyboard or pointing device that is used in combination with a monitor. The server 200 further includes memory 220, which preferably includes both read only memory (ROM) 226 and random access memory (RAM) 222. The server's ROM 226 is used to store a basic input/output system 224 (BIOS), containing the basic routines that help to transfer information between elements within the server 200.

In addition, the server 200 includes at least one storage device or program storage 210, such as a hard disk drive, a floppy disk drive, a CD Rom drive, or optical disk drive, for storing information on various computer-readable media, such as a hard disk, a removable magnetic disk, or a CD-ROM disk. As will be appreciated by one of ordinary skill in the art, each of these storage devices 210 are connected to the system bus 235 by an appropriate interface. The storage devices 210 and their associated computer-readable media provide nonvolatile storage for a personal computer. As will be appreciated by one of ordinary skill in the art, the computer-readable media described above could be replaced by any other type of computer-readable media known in the art. Such media include, for example, magnetic cassettes, flash memory cards, digital video disks, and Bernoulli cartridges.

Although not shown, according to an embodiment, the storage device 210 and/or memory of the server 200 may further provide the functions of a data storage device, which may store historical and/or current delivery data and delivery conditions that may be accessed by the server 200. In this regard, the storage device 210 may comprise one or more databases. The term "database" refers to a structured collection of records or data that is stored in a computer system, such as via a relational database, hierarchical database, or network database and as such, should not be construed in a limiting fashion.

A number of program modules comprising, for example, one or more computer-readable program code portions executable by the processor 230, may be stored by the various storage devices 210 and within RAM 222. Such program modules include an operating system 280, a data module 400, an analysis module 500, a report module 600, and a simulation module 700. In these and other embodiments, the various modules 400, 500, 600, 700 control certain aspects of the operation of the yield management server 200 with the assistance of the processor 230 and operating system 280. In still other embodiments, it should be understood that one or more additional and/or alternative modules may also be provided, without departing from the scope and nature of the present invention.

In general, as will be described in further detail below, the data module 400 is configured to receive, store, manage, and transmit various components of at least input data 410, as may be received and/or acquired from a plurality of sources. In this manner, it should be understood that the data module 400 provides a mechanism via which a plurality of data 410 that has been historically distributed across multiple sources is consolidated for management and analysis (see FIG. 4). According to various embodiments, the data module 400 is configured to provide any combination of the collected data to one or more of the analysis module 500 and/or the report module 600, whether proactively or upon request therefor. In certain embodiments, at least a portion of the data may be additionally and/or alternatively separately provided to the simulation module 700, as will also be described in further detail below.

Upon receipt and/or retrieval of any portion of the above-described input data 410, the analysis module 500 is configured to activate a calculation tool 510 (see FIG. 5). The calculation tool 510 is configured to calculate yield data 515 (e.g., at least the recovery rate for one or more recovered and disposed assets). As a non-limiting example, which will be returned to elsewhere herein and throughout, consider a retail having sold a baseball bat for $100, at MSRP. At some point in time the retailer, as an exemplary user of the systems described herein input that sale data at $100 as user data 401 (see FIG. 5). At some point in time the purchaser then returns the bat to the retailer, after which at another point in time the retailer may also input the recovery sale price as user data 401, for example indicative of a resale of the bat for $60 at a wholesale warehouse location of the retailer. Concurrently therewith, the systems described herein may receive additional disposition data 402 (see FIG. 5), for example from a common carrier, indicative of costs and activities incurred for collection, transport, processing (physical personnel handling and systems for decision making analysis and the like) of the recovered asset). In certain embodiments, tracking data for disposition activities related to the recovered bat asset may be also obtained as a portion of disposition data 402. The calculation tool 510 may be thus configured according to various embodiments to calculate a realized yield, embodied as the afore-mentioned yield data 515 from at least these parameters. For example, yield may be calculated by first subtracting incurred recovery costs from the recovery sale price and then by dividing that result by the original MSRP price. In the present instance, with costs of $35 subtracted from a resale at $60, the recovery rate for a $100 MSRP bat would be 25%. This non-limiting example will be referred to elsewhere herein, as the calculation tool 510 is described in further detail.

Upon generation of the yield data 515, various embodiments of the analysis module 500 may be configured to further execute a comparison tool 520 (see FIG. 5). The comparison tool 520 may be configured generally to compare the calculated yield data 515 (e.g., the calculated recovery rate—for example of 25% for the above-described baseball bat scenario) against analogous transactions conducted and completed by parties in the market other than the retailer/user analyzing the efficiency and effectiveness of the baseball bat transaction. For example, comparison may be made to disposition and recovery data for analogously received baseball bats by other players in the market, so as to identify discrepancies that may be further highlighted for opportunity, as detailed elsewhere herein. Such discrepancies, opportunities, and the like may be contained within generated comparison data 525 (see FIG. 5)

Upon generation of yield data 515 and/or comparison data 525, the report module 600 according to various embodiments is configured to receive or otherwise acquire and use at least some portion of the same as input to a report tool 610. Therewith one or more reports 612 and/or alerts 614 may be generated and/or distributed based at least in part upon the yield data 515 and/or the comparison data 525. In certain embodiments, the report tool 610 may incorporate into generated reports and/or alerts prior report data 404, as may be contained within the data module 400. Reports 612, yield data 515, comparison data 525 may also, according to various embodiments be further and/or additionally transmitted to the simulation module 700, where when combined with retrieved simulation data 405 from the data module 400 may be used to generate and/or further process and/or distribute simulation data 715, all as will be described in further detail elsewhere herein.

In various embodiments, the program modules 400, 500, 600, 700 are executed by the yield management server 200 and are configured to generate one or more graphical user interfaces, reports, instructions, and/or notifications/alerts, all accessible and/or transmittable to various users of the system 20. In certain embodiments, the user interfaces, reports, instructions, and/or notifications/alerts may be accessible via one or more networks 130, which may include the Internet or other feasible communications network, as previously discussed. In other embodiments, one or more of the modules 400, 500, 600, 700 may be alternatively and/or additionally (e.g., in duplicate) stored locally on one or more of the distributed computing devices 100, the distributed handheld devices 110, and/or the central computing devices 120, and may be executed by one or more processors of the same. According to various embodiments, the modules 400, 500, 600, 700 may send data to, receive data from, and utilize data contained in, one or more databases, which may be comprised of one or more separate, linked and/or networked databases.

Returning to FIG. 2, also located within the yield management server 200 is a network interface 260 for interfacing and communicating with other elements of the one or more networks 130. It will be appreciated by one of ordinary skill in the art that one or more of the server 200 components may be located geographically remotely from other server components. Furthermore, one or more of the server 200 components may be combined, and/or additional components performing functions described herein may also be included in the server.

While the foregoing describes a single processor 230, as one of ordinary skill in the art will recognize, the yield management server 200 may comprise multiple processors operating in conjunction with one another to perform the functionality described herein. In addition to the memory 220, the processor 230 can also be connected to at least one interface or other means for displaying, transmitting and/or receiving data, content or the like. In this regard, the interface(s) can include at least one communication interface or other means for transmitting and/or receiving data, content or the like, as well as at least one user interface that can include a display and/or a user input interface, as will be described in further detail below. The user input interface, in turn, can comprise any of a number of devices allowing the entity to receive data from a user, such as a keypad, a touch display, a joystick or other input device.

While reference is made to the "server" 200, as one of ordinary skill in the art will recognize, embodiments of the present invention are not limited to traditionally defined server architectures. Still further, the system of embodiments of the present invention is not limited to a single server, or similar network entity or mainframe computer system. Other similar architectures including one or more network entities operating in conjunction with one another to provide the functionality described herein may likewise be used without departing from the spirit and scope of embodiments of the present invention. For example, a mesh network of two or more personal computers (PCs), similar electronic devices, or handheld portable devices, collaborating with one another to provide the functionality described herein in association with the server 200 may likewise be used without departing from the spirit and scope of embodiments of the present invention.

According to various embodiments, many individual steps of a process may or may not be carried out utilizing the computer systems and/or servers described herein, and the degree of computer implementation may vary.

Yield Management Server 200 Logic Flow

Reference is now made to FIGS. 3-9, which illustrate various logical process flows executed by various embodiments of the modules described previously herein. In particular, FIG. 3 illustrates the overall relationship of the modules 400, 500, 600, 700 of the yield management server 200, according to various embodiments. As illustrated, operation of the system 20 via the server 200 begins, according to various embodiments, with the execution of the data module 400, which receives, stores, manages, and transmits a variety of input data 410 (see FIG. 5). At least portions of the input data 410 are provided, as desirable, to the analysis module 500, as will be described in further detail below. The analysis module 500 is generally configured according to various embodiments to execute one or more tools to calculate and/or compare yield data (e.g., recovery rates) for one or more transactions, all as will be described in further detail below.

Once identified, generated data along with portions of the input data 410 (see FIG. 5) may be provided according to various embodiments to the report module 600, which is configured to generate one or more reports or alerts, which may be transmitted or otherwise provided to one or more users of the system 20 or additional parties or individuals, as may be desirable. A simulation tool 710 may be configured to generate simulation data 715 so as to not only provide users with actual recovery rate or yield data and comparison data, but also opportunity data identifying alternative transactional decisions and the achievable rates available thereby. Various alternatives and configurations are possible, all as will be described in further detail elsewhere herein.

Specifically, detailed steps performed by various embodiments of the data module 400 are described in relation to FIG. 6; steps performed by various embodiments of the analysis module 500 are described in relation to FIG. 7; steps performed by various embodiments of the report module 600 are described in relation to FIG. 8; and steps performed by various embodiments of the simulation module 700 are described in relation to FIG. 9.

Figure 4:
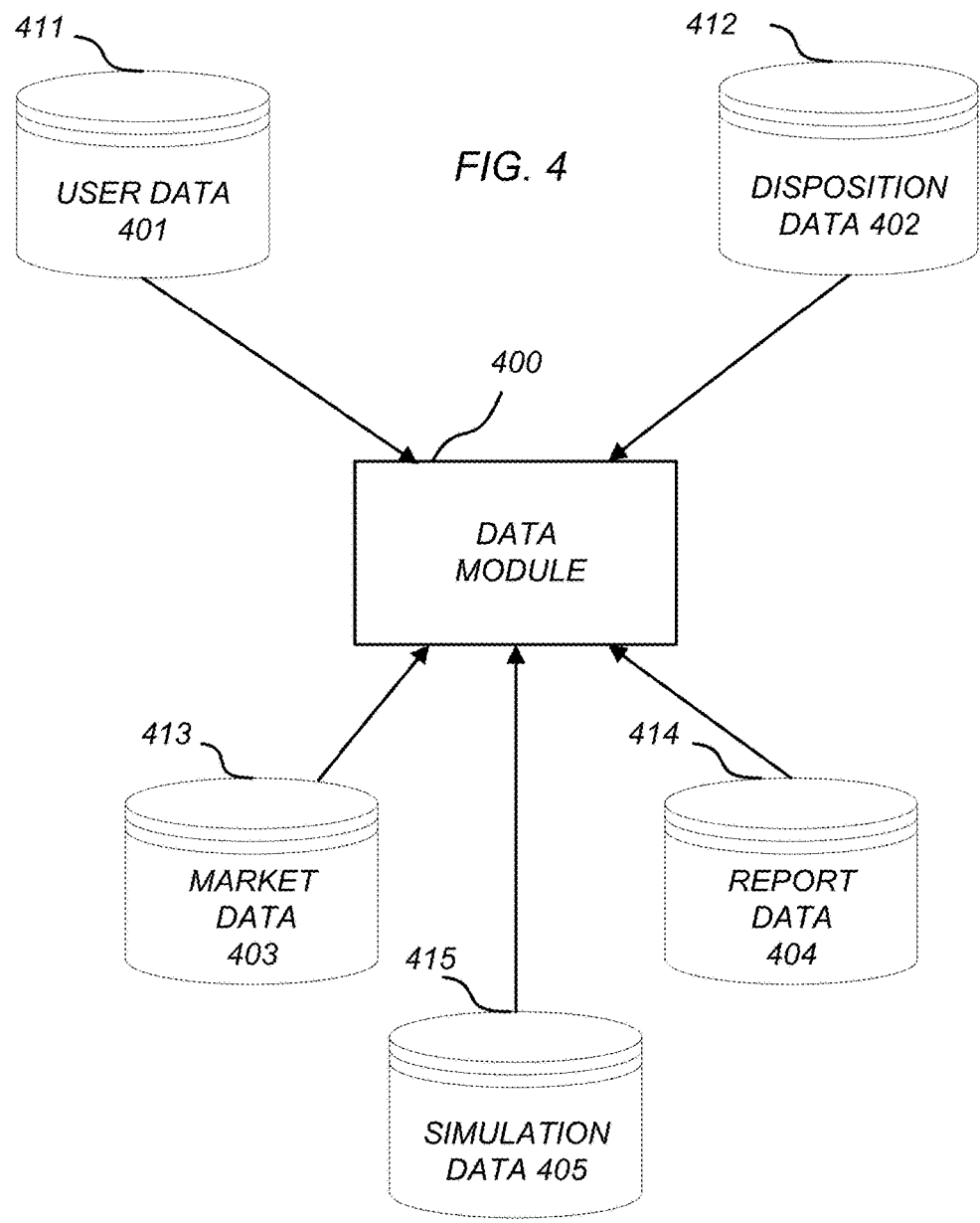
FIG. 4 illustrates a schematic diagram of various databases that are utilized by the yield management system 20 shown in FIG. 1 according to various embodiments.

With reference now to FIG. 4, such illustrates a block diagram of various exemplary databases via which the data module 400 manages a variety of input data 410 (see also FIG. 5). In particular, in at least the embodiment shown in FIG. 4, the following databases are provided: a user data database 411, a disposition data database 412, a market data database 413, a report data database 414, and a simulation data database 415. Although the embodiment of FIG. 4 shows these databases 411, 412, 413, 414, 415 as being separate databases each associated with different types of data, in various other embodiments, some or all of the data may be stored in the same database. In still other embodiments, additional and/or alternative databases may be provided, as may also be desirable for particular applications.

According to various embodiments, the user data database 411 may be configured to store and maintain a variety of user data 401. In certain embodiments, the user data 401 may comprise information concerning one or more customers who use the system 20 associated with the data module 400. Non-limiting examples include MSRP data for one or more inventory products sold or otherwise handled by the user; wholesale price or cost data for the same; recovery or disposition sale price data; and/or one or more business rules informing user decisions with respect to disposition decisions (see FIG. 10). As should be understood from FIG. 10, various delivery points 800 may be available in certain scenarios for certain products, including the non-limiting examples of return of the product (or asset) to a consignor, return of the asset to inventor for resale, liquidation or resale of the asset otherwise, recycling of the asset, donation of the asset, repair and/or refurbishment of the asset, and/or destruction of the asset. Users of the system 20 may be various priorities, preferences, or otherwise established rules that at least in part define their business model and which are taken into account by the system, for example, when simulating alternatives via the simulation module 700. It should be understood that according to various embodiments, a variety of types and details regarding user data 401 may be stored within the user data database 411.

It should further be understood that the user data 401 within the database 411 may be received not only from the one or more customers themselves, but from a variety of sources, either external or internal to the customer, as may be appropriate given particular applications. For example, in certain embodiments, at least a portion of the user data 401 may be based at least in part upon third party obtained data, for example where a third party is at least in part tasked with disposition of a recovered asset and such party may be the one providing, for example, recovery sale data. In other embodiments, such third party data may be contained instead within disposition data 402 at the disposition database 412, as described below.

In any event, in all of these and still other embodiments, it should be understood that, upon receipt of at least some portion of user data 401, the user data database 411 will store any newly received data in a manner associated with at least the data module 400 and for provision (whether automatically, manually, or at a later time) to one or more of the modules 500-700, as will also be described in further detail below. In certain embodiments, updated user data 401 will overwrite previously existing data, for example, where a user's business preferences may alter over time, or where a MSRP value for a specific asset or produce may be revised over time. However, in other embodiments, updated data may be stored in a manner complementary of pre-existing data 410, for example where new recovery sale data is received, as which may be compared (e.g., via the comparison tool 520) against pre-existing data so as to gauge performance and/or improvement of the user's data over time, for example to determine value-added via the tools of the system 20 described herein. With this context, it should also be understood that in any of these and still other embodiments, a variety of alternative configurations and/or components of user data 401 could exist, as may be desirable for certain applications.

According to various embodiments, the disposition data database 412 may be configured to store and maintain disposition data 402 associated with various aspects of the recovered asset disposition process (see FIG. 10). Such may be received and populated, for example, via any of a number of sources, as may be accessing and/or using the system 20. According to certain embodiments, at least some portion of the disposition data may be obtained and/or otherwise received by the system via a common carrier associated with (or providing) the system itself. In this manner, the common carrier may provide disposition data such as non-limiting examples of collection costs, transport costs, transport exceptions, transport confirmations, handling and processing costs from an overhead perspective or otherwise, and any of a variety of data typically monitored and/or collected by common carrier service providers, as such is commonly known and understood in the art to encompass. The general rationale is thus that the disposition data 402 contained within the database 412 may thus be used by the system to provide a further accurate recovery rate or yield data, for example upon resale or recycling or refurbishment of an asset than would otherwise be obtainable without inclusion of such overarching "processing and handling" costs. In any of these and still other embodiments, it should be understood that, upon receipt, the disposition database 412 will store any such disposition data 402 in a manner associated with at least the data module 400 and for provision (whether automatically, manually, or at a later time) to at least one of the modules 500-700, as will also be described in further detail below. In any of these and still other embodiments, a variety of alternative configurations of data content or otherwise could also exist, as may be desirable for particular applications.

According to various embodiments, the market database 413 may be configured to store and maintain a variety of market data 403. Generally speaking, the market data 403 may include third party market user data (i.e., user data for other users of the system or for users other than that being evaluated or users wholly outside the system other than for purposes of market comparison data collection purposes). Such market data 403 may comprise any portion of the user data 401 and/or disposition data 402 as previously described herein, but for other parties within one or more markets (e.g., for all baseball bat retailers that the common carrier may provide transport services for), such that market trends may be determined, assessed, and analyzed relative to user transaction data, not only for purposes of providing an overarching system capability but also for purposes of populating simulation data 405, as described further below and as may be used to further identify opportunities for users to improve recovery or yield rates over time. Still further, in any of these and still other embodiments, it should be understood that, upon receipt, the market database 413 will store any such market data 403 in a manner associated with at least the data module 400 and for provision (whether automatically, manually, or at a later time) to at least one of the modules 500-700, as will also be described in further detail below. In any of these and still other embodiments, a variety of alternative configurations could also exist, however as may be desirable for various applications.

According to various embodiments, the report database 414 may be configured to store and maintain a variety of report data 404. Generally speaking, the report data 404 may include data associated with one or more reports and/or alerts, as may be generated by the system 20 upon calculation of yield data 515 and/or comparison data 525. An exemplary illustration of such report data 404 may be seen in FIG. 11, which illustrates an exemplary visibility report 900 for recovery rate yield management, as may be produced for a particular user operating in multiple product fields. As may be understood from FIG. 11, report data, when formatted as a chart (or otherwise) may be categorized by type of product 920 (e.g., apparel, shoes, health/beauty, high tech, sports, etc.), by price brackets 910 (whether based upon MSRP or otherwise), or in any fashion as may be desirable for particular applications. As may be seen further from FIG. 11, the report data 404 may include not only recovery or yield data 902 (e.g., as derived or based upon calculated yield data 515) but also rating data 904 (e.g., as derived from comparisons of specific yield data to market data or market trends, as described elsewhere herein). Still further, in any of these and still other embodiments, it should be understood that, upon receipt, the report database 414 will store any such report data 404 in a manner associated with at least the data module 400 and for provision (whether automatically, manually, or at a later time) to at least one of the modules 500-700, as will also be described in further detail below. Of course, in any of these and still other embodiments, a variety of alternative configurations could exist, as may be desirable for particular applications.

According to various embodiments, the simulation database 415 may be configured to store and maintain a variety of simulation data 405. Generally speaking, the simulation data 405 may include any of a variety of data associated with a plurality of data points within one or more asset recovery supply chain networks, across single user infrastructures or across multiple user infrastructures. Such data may be displayed graphically, as may be understood from FIG. 12, such that users of the system 20 may identify opportunities to improve recovery rates or yield data results, not only for particular products or categories of products, but also across their entire network. Such simulation data 405 may also include historical actual data, preferences, and/or business rules, as may be applied to generate a simulation and/or model based thereon, in conjunction with the yield data 515 generated by the system 20 described herein or otherwise. Still further, in any of these and still other embodiments, it should be understood that, upon receipt, the simulation database 415 will store any such simulation data 405 in a manner associated with at least the data module 400 and for provision (whether automatically, manually, or at a later time) to at least one of the modules 500-700, typically to at least the simulation module 700, as will also be described in further detail below. Of course, in any of these and still other embodiments, a variety of alternative configurations could exist, as may be desirable for particular applications.

According to various embodiments, any of the previously described databases may be configured to store and maintain not only textually based data, but also graphically based data, as may be generated by the system 20 (or otherwise) and be based, at least in part, upon the textually based data. Still further graphical (e.g., charts, graphs, maps, etc.) may also be stored within one or more of the databases, wherein such may be, at least in part, independently derived, relative to the textually based data. Non-limiting examples of such graphically based data include trend graphs, historical plot charts, pie charts, diagrams, network maps (e.g., as may be particular useful in the context of simulation and intelligent visibility), and the like, all as will be described in further detail elsewhere. Non-limiting examples of such appear in at least FIGS. 11-12, as will also be described elsewhere herein. In any event, it should be understood that in any of these and still other embodiments, the graphically based data may be used to visually combine various portions of data contained within the various databases previously described herein. Still further, various algorithms and/or pre-determined parameters, rules, and/or mitigating procedures may also be stored in any of the various databases within the system 20, as may be desirable for various applications, to the extent such have not been previously described and/or allocated herein.

Summary of Exemplary System Operation

As indicated above, various embodiments of the service cycle management server 200 execute various modules (e.g., modules 400, 500, 600, 700) to provide an integrated platform and system 20 that dynamically calculates and compares yield or recovery rates for disposition of various recovered assets so as to provide users of the system 20 with improved visibility of yield performance and to further, in certain embodiments, identify areas for opportunity and/or improvement, whether based upon comparison data to market trends or otherwise.

According to the embodiment shown in FIG. 5, the yield management server 200 begins with the execution of the data module 400, which is configured to receive, store, manage, and transmit a variety of input data 410, the details of which have been described previously herein. In certain embodiments, at least a portion of the data is provided to the analysis module 500 for further processing, either automatically upon, for example, receipt of at least a portion of user data 401 and disposition data 402. In at least the illustrated embodiment of FIG. 5, report data 405 and simulation data 406 may be alternatively provided to the report module 600 and/or the simulation module 700, instead of to the analysis module 500, as may be desirable for particular applications. It should be understood however that various alternatives may exist within the configured processes of the data module 400, all as will be described in further detail below.

In various embodiments, remaining with FIG. 5 and its illustration of the overall interactive nature of the various modules, the analysis module 500 is configured to receive various pieces of the input data 410, for example at least initially user data 401 (e.g., from a user) and disposition data 402 (e.g., from a common carrier and/or a user) and upon receipt thereof activate a calculation tool 510. In certain embodiments, the calculation tool 510 executes one or more algorithms upon the data, so as to determine yield data 515 for the particular transaction being examined (e.g., for a particular recovered asset, such as the baseball bat described previously herein as a non-limiting example). The analysis module 500 is further configured, according to various embodiments, to execute a comparison tool 520, which upon determination of the yield data 515, further generates comparison data 525 representative of a relative difference between the calculated yield data values and such values retrieved and collected from more generalized market data 403, which may include, for example yield data for a competitor also handling and processing recovered baseball bats for resale or alternative disposition (see FIG. 10). In various embodiments, upon determination and comparison of such data and generation of at least some portion of yield data 515 and comparison data 525, the analysis module 500 is further configured to provide any generated data (e.g., 515, 525) to at least the report module 600 for further processing. In still other embodiments, such data may be further provided to a simulation module 700, as may be optional in certain embodiments.

In various embodiments, the report module 600 is configured to, upon receipt of yield data 515 and comparison data 525 activate a report tool 610, which is configured to generate one or more reports 612 and/or alerts 614. Alerts may be textual, audial, visual, or otherwise, all as are commonly known and understood in the art. Reports may be graphical, textual, and/or otherwise, with an exemplary report being illustrated in at least FIG. 10. As may be seen therefrom, a combination of textual and graphical data may be categorized and presented so as to inform users not only of specific yield performance for purposes of management thereof, but also of relative yield performance (e.g., via a stop-light type "R"=red, "Y"=yellow, "G"=green or otherwise) for purposes of identifying areas upon which focus may be placed to maximize returns and improvements to realized yield values, all as will be described in further detail elsewhere herein. In these and other embodiments, it should further be understood that the report tool 610 may be configured to not only generate, but to also transmit and/or display the instructions 616 to one or more users of the system, whether automatically, periodically, as desired according to pre-determined user parameters, or otherwise. Such transmittals may be via the one or more networks 130, as previously described herein, and such displays may be via one or more interfaces, whether a web-based portal or otherwise, as may be accessible via the one or more distributed computing devices 100 and/or distributed handheld devices 110, as also described previously herein. Of course, any of a variety of reporting and notification configurations may be envisioned, all as may be desirable for particular applications.

As may be seen from FIG. 5, the simulation module 700 is configured to, upon receipt of various components of data, such as non-limiting examples of yield data 515, comparison data 525, reports 612 or otherwise, execute a simulation tool 710. The simulation tool 710 is configured according to various embodiments to execute one or more algorithms and/or business rule engines to generate simulation data 715, which may in turn be used to generate one or more modified reports (not illustrated), which may be configured to identify for a user particular areas within their product offerings or business network where improvements or modifications may be made so as to further improve or maximize realized yield or recovery rates. For example, where industry standard yield in the non-limiting example of recouping costs for a recovered baseball bat asset may average in the 20-30% range for recovery rates (or yield rate), various embodiments of the system 20 described herein, particularly those incorporating a simulation tool 710 may be capable of facilitating improvement of such yields to ranges of 40-60%. Even in those embodiments lacking a simulation tool 710, mere monitoring may facilitate a 10-20 percent improvement over a pre-determined period of time. Of course, such described ranges and degrees of improvement are exemplary and should be considered non-limiting in nature.

Data Module 400

According to various embodiments, as previously mentioned herein, the data module 400 is configured to receive, store, manage, and transmit a variety of input data 410. Receipt may be from any of a variety of entities (e.g., a customer retailer or user of the system 20, a common carrier service provider, various other users of the system 20, external third party market competitors, etc.) and transmission may be to one or more of the modules 500-700, as will be described in further detail below.

FIG. 6 illustrates steps that may be executed by the data module 400 according to various embodiments. Beginning with step 420, the data module 400 assesses whether any data (e.g., input data 410, which may include user data 401, disposition data 402, market data 403, and the like, all as illustrated in FIG. 5) has been received by the module. In certain embodiments, the data module 400 makes this assessment by periodically scanning one or more databases (see FIG. 4) associated with the module and by identifying some portion of data within one or more of the databases that was not present during a previous periodic scan under step 420. Of course, alternative configurations may be envisioned, wherein, as a non-limiting example, the data module 400 may actively receive data (e.g., as input by a user of the system 20 via an interface, whether web-based or otherwise) and upon receipt thereof, execute step 430.

As an initial non-limiting example, which has been referred to previously herein, the newly received input data 410 may comprise user data 401 indicative of a recovery sale value obtained by refurbishing a baseball bat, namely for resale at $60. In this example, some portion of user data 401, namely a MSRP value or otherwise original price for the bat would also have been obtained and/or received by the data module 400, either prior to receipt of the resale data or concurrently therewith. Such data would be processed by the data module 400 during step 420, followed by transmittal of some portion of the same to the analysis module 500 in step 430, as will be described further below. In certain embodiments, report data 404 and/or simulation data 405 may be received and/or updated, in which case the data module 400 may be configured in step 430 to transmit the same to the report module 600 and/or the simulation module 700, as may be desirable for certain applications.

As previously mentioned, with reference again to FIG. 6, in any of these and still other various embodiments, if "newly received" input data 410 is identified, the data module 400 proceeds to step 430; otherwise the module proceeds into a static loop via step 425. During step 425, the data module 400 may be configured to passively stand by for receipt of new input data 410. In certain embodiments, the module 400 may, in step 425, periodically (e.g., every 5 seconds, or at any desirable interval) proactively ping one or more databases contained therein. Various alternative data monitoring configurations may be envisioned, without departing the scope and nature of the present invention, as such are commonly known and understood in the art.

According to various embodiments, during step 430, the data module 400 is configured to transmit at least a portion of received input data 410 to at least the analysis module 500. In certain embodiments, the data module 400 may be configured to automatically perform step 430, while in other embodiments, the module may perform such only periodically, at an interval predetermined by one or more users of the system 20, as may be desirable for particular applications. In still other embodiments, the data module 400 may automatically transmit a portion of the data (e.g., user data 401 and/or disposition data 402), while another portion of the data (e.g., market data 403) may be transmitted subsequently, for example, upon request therefor by the analysis module 500, as will be described in further detail below. In any of these and still other embodiments, any portion of the input data 410 may be further transmitted to the report module 600 and/or the simulation module 700 or otherwise exchanged, whether automatically or upon request therefor, as may be desirable for certain applications.

Analysis Module 500

As previously described, upon receipt and/or retrieval of any portion of input data 410, the analysis module 500 is configured to calculate yield data 515 (e.g., a recovery rate value for a particular transaction based at least in part upon received input data 401 and/or disposition data 402). In certain embodiments, the analysis module 500 is further configured to compare calculated yield data 515 against market data 403, as may be obtained from one or more users of the system other than the user privy to the particular transaction in question. Further details in this regard are provided below.

With reference now to FIG. 7, which illustrates various steps that may be executed by the analysis module 500, according to various embodiments the module is configured to begin in step 530 by receiving at least some portion of data from the data module 400. It should be understood that in certain embodiments, the analysis module 500 may be configured to periodically and/or continuously proactively retrieve and/or check for new data 410, as may be transmitted from the data module 400. In other embodiments, the analysis module 500 may merely passively await receipt of data from the data module, as may be desirable for particular applications.

According to various embodiments, data received in step 530 may comprise either input customer data 401 and/or disposition data 402 although any of a variety of types of input data 410 may be received, as may be applicable in certain scenarios. Such data may be entered by a user via exemplary interface screen displays (not shown), which may be accessed by one or more users and/or customers of the system 20. In any of these and still other embodiments, upon receipt of data in step 530, the analysis module is configured to proceed to step 540, wherein a calculation tool 510 (see also FIG. 5) is executed. Otherwise, if no data is received in step 530, the module 500 proceeds to step 535, entering a static loop of sorts until new data is ultimately received and identified in step 530.

During step 540, the analysis module 500 is configured to according to various embodiments execute a calculation tool 510 to calculate a yield or recovery rate (represented as yield data 515 in step 550) based upon received and/or retrieved data. In certain embodiments, the calculation tool 510 may be configured to execute an algorithm that calculates yield based upon the following non-limiting formula: [(recovery sale−recovery cost)]/(MSRP). In other embodiments, the denominator may be any original value of a recovered asset, MSRP or otherwise. In these and other embodiments, the recovery sale may be any value or revenue obtained via disposition of the recovered asset (e.g., resale of the bat at $60, recycling credit of $5 for return of aluminum-based products, etc.). Similarly, in any of these and other embodiments, the recovery cost may include the non-limiting examples of collection costs, transportation costs, disposition costs (e.g., determining via one or more systems how to handle the recovered asset), and/or disposal processing costs (e.g., handling by people and other technology layers within the user's network). In other words, the "recovery cost" in its entirety should represent in various embodiments the cost incurred by a user and/or common carrier (or otherwise) during the course of processing a recovered asset for final disposition.

Referencing our afore-mentioned non-limiting example of a returned baseball bat, the calculation tool 510 may receive (e.g., from a user of the system) disposition data 402 indicative of a final disposition (e.g., resale) of the bat for $60. Upon receipt thereof, the module 500 may be configured in certain embodiments to execute step 540 and further step 545, wherein for example previously received input data 401 (e.g., MSRP data reflecting MSRP of $100) and/or disposition data 402 (e.g., collection and transportation costs of $20 and processing and handling costs of $15). Upon retrieval of all such pertinent data, as the calculation tool 510 may be configured to automatically assess and/or evaluate, the module 500 is configured according to various embodiments to proceed to step 550, wherein the yield data 515 (e.g., recovery rate—expressed as a percentage or otherwise, as may be desirable) is calculated. In the continuing non-limiting example, the yield data 515 or recovery rate would thus be 25%, based upon MSRP of $100, resale of $60 and incurred recovery/disposition cost of $35.

Returning now with focus on FIG. 7, it is worth reiterating that during execution of step 540 according to various embodiments, the analysis module 500 may further execute step 545, wherein additional input data 401 and/or disposition data 402 may be proactively retrieved from the data module 400. With reference to the previously noted non-limiting examples, such may be necessary when, upon receipt of an recovery sale price from a user of the system, user input data related to MSRP value of the product in question (e.g., a baseball bat) must be obtained as well before calculations of a yield or recovery rate may be performed. In other embodiments, additional data may be automatically or otherwise provided proactively by the data module 400, as may be desirable for particular applications.

Turning now with focus upon step 560 of FIG. 7, the calculation tool 510 may be configured according to various embodiments to, upon generation of the yield data 515 to transmit such to a comparison tool 520. In certain embodiments, the calculation tool 510 may be configured to alternatively and/or additionally transmit the yield data 515 in step 555 to the report module 600 and/or the simulation module 700. In at least one embodiment, such may be to facilitate prompt generation of alerts and/or reports to users of the system, where for example a calculated recovery rate within the yield data 510 may exceed a particular threshold (or fall outside a particular range), however as may have been defined by the user/recipient, as will be described in further detail elsewhere herein.

In any event, upon generation of the service selection data 515 during step 550, the analysis module 500 is configured to proceed in certain embodiments to step 570, wherein a comparison tool 520 (see FIG. 5) is executed. As may be understood from FIG. 7, in certain embodiments the tool 520 may further retrieve various portions of market data 403 in step 575, which may be performed concurrently with step 560, step 570, or otherwise, however as may be desirable. In other embodiments, the market data 403 may be transmitted along with the yield data 515 otherwise transmitted to the comparison tool 520 or the calculation tool 510, as previously described herein. Indeed, in certain embodiments, the calculation tool 510 may be configured to generate yield data 515 based not only upon the newly received input and/or disposition data, but also upon the market data 403, which may itself comprise similar elements (e.g., MSRP value, resale value, recovery processing costs, and the like, for other users of the system or for third party players in analogous marketplaces). In other embodiments, the market data 403 may further comprise calculated market yield data for various scenarios, whether such is calculated and determined within and by the system 20 (as previously described herein) or otherwise.

During step 580, the comparison tool 520 is configured to generate comparison data 525 based at least in part upon execution of an algorithm to identify one or more differences, similarities, discrepancies, or the like between the market-calculated yield data and the specific transactional-calculated yield data 515. In certain embodiments, the comparison data 525 may trigger certain further processing (e.g., transmission to the report module 600 for generation of an alert) where a threshold difference is determined between the market yield data and the specific-calculated yield data 515. In other embodiments, the comparison data 525 may further account for trend data, as a non-limiting example, highlighting where specific-calculated yield data 515 may be diverging from market trends for analogously situated market players or users of the system (e.g., competitors also selling and recovering baseball bats, but with a different degree of yield than that realized by the particular user who's transaction is being analyzed by the analysis module 500. A variety of alternatives and additional configurations may be envisioned in this regard.

Notably, upon generation of the comparison data 525 during step 580 according to various embodiments, the analysis module 500 is configured to proceed to step 590, wherein at least a portion thereof is transmitted to the report module 600 and/or the simulation module 700 for further processing and handling, all as will be described in further detail below.

Report Module 600

With reference to FIG. 8, according to various embodiments, the report module 600 is configured to generate one or more reports 612 and/or alerts 614 to one or more users of the system 20 (or other parties), as may be desirable according to particular applications. In certain embodiments, the reports 612 and/or alerts 614 are based at least in part upon the generated yield data 515 and/or comparison data 525, as have been previously described herein, although in other embodiments still further data may be incorporated therewith (e.g., market data 403). It should be understood, however, that according to various embodiments the report module 600 is configured so as to facilitate users of the system 20 obtaining data from which they can assess and/or revise asset recovery-focused decisions, so as to most efficiently and effectively maximize recovery rates and/or yield values over time.

Beginning with step 620, the report module 600 is configured according to various embodiments to assess whether any data (e.g., yield data 515 and/or comparison data 525, which may be generated by the various tools of the analysis module 500, as previously described herein) has been received by the module. In certain embodiments, the report module 600 makes this assessment by periodically scanning one or more databases (see FIG. 4) associated with the data module 400 and by identifying some portion of data within one or more of the databases that was not present during a previous periodic scan under step 620. Alternative configurations may be envisioned, wherein, as a non-limiting example, the report/execution module 600 may actively receive data directly from the analysis module 500 (as illustrated in at least FIG. 5).

With focus again on FIG. 8, in any of these and still other various embodiments, if "newly received" data is identified in step 620, the report module 600 proceeds to step 630; otherwise the module proceeds into a static loop via step 625, pending receipt of new data. During step 625, the report module 600 may be configured to passively stand by for receipt of data. In certain embodiments, the report module 600 may, in step 625, periodically (e.g., every 5 seconds, or at any desirable interval) proactively ping one or more databases contained within the data module 400 and/or the analysis module 500, as may be desirable. Various alternative data monitoring configurations may be envisioned, without departing the scope and nature of the present invention, as such are commonly known and understood in the art.

During step 630, the report module 600 is configured to run a report tool 610, which is generally configured to generate, in step 650, one or more reports 612 and/or alerts

614 based at least in part upon the yield data 515 and/or the comparison data 525. For example, in certain embodiments, a customer or user of the system 20 may request transmittal of an alert 614, as to keep them informed, but not necessarily of every detail regarding the data being analyzed. In other embodiments, the alert(s) 614 may be generated concurrently with the reports 612.

With reference momentarily to FIG. 11, an exemplary visibility report 900 is illustrated, as may be generated via the report module 600. Report data, when formatted as a chart (or otherwise) may be categorized by type of product 920 (e.g., apparel, shoes, health/beauty, high tech, sports, etc.), by price brackets 910 (whether based upon MSRP or otherwise), and/or in any fashion as may be desirable for particular applications. As may be seen further from FIG. 11, the report data 404 may include not only recovery or yield data 902 (e.g., as derived or based upon calculated yield data 515) but also rating data 904 (e.g., as derived from comparisons of specific yield data to market data or market trends, as described elsewhere herein).

Particularly noteworthy from FIG. 11, according to various embodiments, the rating data 904 may be presented in a "stop-light" type format, relative to various ranges of desired yield data 902. As a non-limiting example, recovery rate percentages or yield data 902 in the range of 10-20% may be deemed "red" according to various business rules or otherwise pre-determined parameters, thus identifying such as an area of user focus for future efforts and/or initiatives. In these and other embodiments, as another non-limiting example, recovery rate percentages or yield data 902 in the range of 20-40% may be deemed "yellow" according to various business rules or otherwise pre-determined parameters, thus identifying such as an area of possible improvement, although, in some instances, less so than "red" identified ranges. In these and yet other embodiments, recovery rate percentages or yield data 902 in the range of 40% and above may be deemed "green" according to various business rules or otherwise pre-determined parameters, thus identifying such as areas in which recovery is already effective and efficient.

It should be understood that the above-noted rate ranges with reference to FIG. 11 are exemplary and should thus be considered non-limiting. According to various embodiments, the determination of "green" or "yellow" or "red" status may be based at least in part upon further market data 403, as may be available so as to compare the present user against others in analogous industries and/or handling analogous products (e.g., via comparison data 525, as described elsewhere herein). Returning to our particular non-limiting example of a baseball bat, with reference to FIG. 11 still, such would be categorized as sports, with an initial price (e.g., MSRP) of $100. Taking into consideration recovery costs and a recovery sale price of $60, it may be determined by the system 20 and thus displayed that the recovery rate thereof is 22%, coded as "yellow" relative to what competitors are recovering in the broader marketplace for similarly situated "sports" related products. Upon receipt of a report such as that in FIG. 11, a user of the system 20 may thus be able to identify the recovery routes and disposition choices (see FIG. 10) for baseball bats as a potential area for focus and initiatives, so as to, as a non-limiting example, improve the 22% rate into a "green" 40% or greater rate.

Remaining with FIG. 11, it is also worth highlighting, as previously alluded to herein, that the color-coding may be not only variable depending upon a variety of predetermined parameters and the like, but it may also vary dependent upon category of products being examined. For example, under shoes, a return rate of 24% in the $100-$250 MSRP range may be considered "yellow" and an area of possible improvement, whereas a return or recovery rate of 24% in the $250-$500 MSRP range may be considered "red" and an area of critical concern in the context of health and beauty products. As another non-limiting example, under shoes in the range of $250-$500, a recovery rate of 32% (or >30%) may be deemed satisfactory and thus "green" according to certain predetermined parameters or conditions, as may be imposed by a user of the system 20 or by market trend data generally, whereas in the health and beauty market, an analogous recovery rate of 32% in the $50-$100 range (or another range) may be deemed "yellow" and of potential concern, where for example a greater rate of recovery is desirable. In certain instances, greater rates may be desirable where it may be known that costs reducing the recovery rate may be relatively easily altered and/or reduced, whereas in other markets such costs may be less fluid, for example where a wholesale refurbishment facility incurs costs due to its location, but relocating that facility would be unrealistic and/or undesirable. It should be understood generally via these examples and the illustrates of FIG. 11 that any of a variety of reports, report data, and interpretive analysis thereof may be provided to users of the system 20 via the report module 600.

It should also be understood, returning to FIG. 8, that according to various embodiments, during step 660, any combination of the reports 612 and/or alerts 614 may be generated, as may be influenced by previously defined parameters, whether by the customer or other users of the system 20. For example, a customer may have a pre-established rule that they receive an alert 614 of all identifications by the analysis module 500 of recovery rates that result in a "yellow" color coding (see again FIG. 11). Simultaneously and/or alternatively, a service provider may request a report alongside an alert when a "red" color coding event is identified, so as to not further delay or defer mitigating activities that may be evaluated and/or facilitated. Additional and/or alternative formats of reporting and/or communication may be envisioned without departing from the scope and intent of the present invention, and any of those, like those described previously herein, may be implemented in a manual or automatic fashion, electronically or otherwise, however as may be desirable.

Simulation Module 700

With reference to FIG. 9, according to various embodiments, the simulation module 700 is configured to establish an additional (in some instances optional) simulation service that provides an additional analytics tool that moves the transparency provided for user product networks from descriptive to prescriptive. In other words, the simulation module 700, according to various embodiments, may be configured to further inject the yield data 515 and/or comparison data 525 into a user's network, so as to not only provide a broader degree of analysis, but to also enable users to proactively adjust elements within the network, over time, to improve or otherwise enhance recovery rates (or yield), however as may be desirable. Various options and alternative configurations may exist and that described hereinbelow is merely exemplary and non-limiting in nature.

With reference momentarily to FIG. 12, an exemplary display 1400 may be provided via a customer/user interface associated with the system 20, whether online or otherwise. The display 1400 is generally configured to provide a simplified network representation that uses system provider data (e.g., tracking, network management, and the like) and customer business rules to illustrate network-wide recovered asset handling performance, bottlenecking or under-performing areas, suggested areas of improvement or optimization focus, and drill-down opportunities to refine focus. In this manner, the simulation service can provide a network simulation for proactively managing operations, versus merely reactively adjusting the same. In certain embodiments, the simulation data may be overlaid upon actual disposition and/or user (e.g., yield or recovery rate) data so as to identify discrepancies, bottlenecks, and/or underperformance. It may also be seen that the simulation data may be further overlaid upon a geographical map indicative of physical locations of various nodes (e.g., parties, systems, facilities) integrated within a user's network or otherwise, however as may be desirable for particular applications. Different lines between successive nodes may be identified as optimal 1030 (e.g., perhaps green coded), in need of improvement 1020 (e.g., perhaps yellow coded), and creating issues 1010 (e.g., perhaps red coded). In this manner, users of the system may proactively target notes 1020 and/or 1010 for initiatives aimed at improving recovery rates or overall yield values.

Returning to FIG. 9, with the context of FIGS. 11 and 12, various embodiments of the simulation module 700 are configured to assess whether any data has been received by the module. In certain embodiments, the simulation module 700 makes this assessment by periodically scanning one or more databases (see FIG. 4) associated with the data module 400 and by identifying some portion of data within one or more of the databases that was not present during a previous periodic scan under step 720. Alternative configurations may be envisioned, wherein, as a non-limiting example, the simulation module 700 may actively receive data directly from at least one of the data module 400 and/or the analysis module 500, as may be desirable for particular applications.

With focus again on FIG. 9, in any of these and still other various embodiments, if "newly received" data is identified in step 720, the simulation module 700 proceeds to step 730; otherwise the module proceeds into a static loop via step 725, pending receipt of new data. During step 725, the module 700 may be configured to passively stand by for receipt of data. In certain embodiments, the module 700 may, in step 725, periodically (e.g., every 5 seconds, or at any desirable interval) proactively ping one or more databases contained within the data module 400, as may be desirable. Various alternative data monitoring configurations may be envisioned, without departing the scope and nature of the present invention, as such are commonly known and understood in the art.

During step 730 according to various embodiments, the simulation module 700 is configured to execute a simulation tool 710, which is configured to apply various components of actual data (e.g., yield data 515, comparison data 525, and/or report data 612) against existing simulation data 405, as may be user or otherwise populated and/or defined, so as to generate simulation data 715. In certain embodiments, the generated simulation data 715 may thus provide an additional visibility tool with which users of the system 20 may proactively influence yield and recovery rates in a more effective and efficient manner than otherwise feasible. Remaining with FIG. 9, it should be understood that upon generation of simulation data 715 during step 740, various embodiments of the simulation module 700 are further configured to, in step 750, process (e.g., transmit) the same to any of the modules 400-600 and/or users of the system, as may be desirable for particular applications.

Conservation Logistics System and Configurations

A variety of resources are utilized during the course of a logistics or supply chain service cycle, all having an economic impact that can, in certain instances, create concern regarding the ecological (and/or economic) impact thereof. Non-limiting examples of consumed resources include energy, water, and natural resources. Consumption thereof range from, again as non-limiting examples, the production of packaging materials to the burning of gasoline or diesel fuel during the course of deliveries that perhaps could be executed more efficiently. As sustainability initiatives gain increasing visibility across corporate avenues, ways to conserve these resources must be explored.

Traditionally speaking, logistics provider or logistics carrier consumption has been addressed in one of two primary ways. The first is via avoidance, whereby real carrier behavior (i.e., internal behavior, as referenced elsewhere herein) changes, such that consumption is reduced internally. For example, by maximizing delivery route efficiency and avoiding "idle time," the consumption of gasoline or diesel fuel may be reduced. Typically speaking, however, logistics carriers can only hope to avoid approximately 1-2% of their total consumption per year. As a result, logistics providers or carriers also seek to off-set their consumption. Off-sets may be via investment in alternative energy credits that compensate for consumption by, at least theoretically, "removing" emissions from the environment. Additional reductions in consumption, beyond the 1-2% noted above, may be achieved, primarily because such off-sets do not require any change to actual internal behavior and/or to actual consumption.

Yet the above remains a rather limited scope of evaluating consumption management by logistics providers, particularly when considered in view of the disclosure provided elsewhere herein, which considers not only internal actions (i.e., those by the carrier or logistics providers) but also those of external partners thereof. In this sense, logistics carriers are arguably quite uniquely positioned to globally influence consumption levels for natural resources utilized during the transport of a plurality of packages, regardless of whether such occurs during the forward or return segment of a comprehensive supply chain service cycle. Not only is such positioning desirable from an ecological standpoint, desirable economic considerations also influence the need to position logistics providers a leaders in the field of global sustainable consumption.

Various considerations in this regard, particularly with respect to a complete supply chain service cycle are described in extensive detail in U.S. patent application Ser. Nos. 14/182,066 and 14/182,092—the contents of both of which as are hereby incorporated by reference herein in their entirety. Yet further improvements remain desirable, such as, as a non-limiting example, the development of efficient and useful measurements of eco-impacts that account holistically for all contributing factors, both those internal to the logistics provider and those created by one or more external partners thereof. With that, we turn to FIG. 13.

According to various embodiments, the yield management system 20 and the yield management server 200 (along with their respective modules 400-700 and/or the various tools embodied therein) described elsewhere herein are configured to be utilized within a service cycle supply chain network 1000 such as that illustrated in FIG. 13. Generally speaking, service cycle management is a technology and business process, whereby various assets and commodity items are manufactured and distributed to the consumer market. During the forward cycle 1010, a manufacturing logistics process 1011 begins with raw materials 1012 (e.g., component level parts and the like), which are manufactured 1013 by one or more entities for final assembly 1014. Upon final assembly, the assets and/or commodity items enter a distribution logistics process 1015, whereby sales 1016 occur to transfer the assets and/or commodity items to one or more consumers 1017 (also referred to elsewhere herein as customers), who then typically requires, via agreement or otherwise, certain post-sales support 1018.

At some point during the post-sales support 1018 life cycle, a consumer and/or customer may request collection, test, and/or disassembly 1021 of the asset or commodity item. According to various embodiments, when such occurs, the asset or commodity item enters what is commonly referred to as the reverse service cycle flow 1020. During the reverse cycle, which may be initiated by end of life, breakdown, or otherwise lack of consumer desire for the asset or commodity item, a plurality of decisions are made regarding possible recapture of any remaining value within the asset or commodity item. As FIG. 13 illustrates, a serial progression of options exist, ranging from minimal complexity options (e.g., reuse 1022 and repair 1023) that may only involve cleanup of the asset or commodity item or at most repair of minor parts, to higher complexity options (e.g., refurbish 1024, remanufacture 1025, and/or recycle 1026), whereby the asset or commodity item may be entirely rebuilt and/or substantially disassembled for future sale of components and/or scrap materials. As should be generally understood, as may be seen also in FIG. 11, the optimal option is oftentimes at least in part dependent upon the nature of the asset or commodity items and/or the market in which it exists (e.g., see the non-limiting examples of retail materials, healthcare machines, and high tech items such as laptop computers 1140).

Returning to FIG. 13, under traditional (e.g., conventional) service cycle supply chain management processes, decisions regarding the recapture of any remaining value in an asset or commodity item were predetermined far in advance of occurrence of the post-sales support 1018 triggering event. Oftentimes, such creates inefficiencies and/or ineffective handling of the asset or commodity item. As such, various embodiments of the present invention are configured to not only provide an integrated infrastructure (as will be described later herein), but to also consolidate the decision-making process with a single service cycle management system, which can in a near-real time fashion assess the optimal reverse cycle option for the particular asset or commodity item, simultaneously looking both to the left (e.g., toward disposal options 1030, which may include end of life disposition 1033, economic reuse in a secondary market 1032, and/or reuse or donation 1031) and to the right (e.g., toward the forward loop reentry options 1010 (e.g., as previously described), whereby remaining asset or commodity item value may be recaptured). The manner in which various embodiments of the yield management system 20 achieves the optimal management, which is based at least in part upon customer-desired outcomes (e.g., yield, return, etc.), will be described in further detail below in the context of at least the analysis module 500.

Remaining further with FIG. 13, a non-limiting example is useful to illustrate the process described above, which example will be referred to elsewhere herein for explanatory purposes, consider a customer as a purchaser of one or more magnetic resonance imaging (MRI) machines may, upon purchase thereof, enter into a warranty and/or service agreement, whereby preventative service and replacement of the machines may be provided by a supplier thereof. Under traditional service and/or replacement models, a technician for the MRI machine may inspect the machine periodically and, for example, upon breakdown, request a replacement part. Alternatively, the machine may be scheduled for transport for off-site repair and/or for whole replacement, for example in the instance of breakage of a critical component. In either scenario, once post-sales support 1018 (see again FIG. 10) is initiated, the MRI machine enters the reverse loop service cycle 1020, which is managed according to various embodiments of the yield management system 20 of the present invention in the manner, as will be described elsewhere herein.

For purposes of illustration, however, where the MRI has broken down, various embodiments of the system 20 are configured to dynamically assess the options (1022-1026) so as to determine the optimal route, based at least in part upon pre-established customer-defined outcomes, all as will be described in further detail elsewhere herein. For example, if the customer wants to maximize the life cycle of the MRI machine, the system 20 may determine that repair 1023 of the part may be optimal and thus coordinate internally transport and installation of the replacement part, as necessary. Alternatively, if the customer has defined a desire to wholly replace any machines upon breakage of part "X," then the system 20 is configured according to various embodiments to at least initially coordinate collection, test, and/or disassembly 1021 of the MRI machine. In certain embodiments, the system 20 may be configured such that the system provider not only coordinates but also performs the tasks necessary for collection, text, and/or disassembly. In other embodiments, the system provider may further coordinate and/or perform the tasks necessary for providing a replacement/rental asset or commodity item, where collection involves removing the asset or commodity items from its typical location, whether such is intended to be temporary or permanent in nature.

Remaining with the non-limiting example of the MRI machine, as may be also understood from FIG. 13, upon collection, test, and/or disassembly 1021, various embodiments of the system 20 are configured to determine the optimal processing route for the MRI machine. If part "X" is one or more gradient coils adjacent the magnet, in view of a customer's desire to maximize, for example, yielded revenue for disposition of the MRI machine, various embodiments of the system 20 are configured to assess how such is achieved, whether by refurbishment 1024, followed by (re)sale 1016 in a direct market in the forward loop 1010 or in a secondary market via economic reuse 1032, thus illustrating the "look left; look right" logic employed by the system, as will be described in further detail below in the context of at least the analysis module 500. With reference to the non-limiting example of the MRI machine, the system 20 may determine that refurbishment 1024 followed by a direct resale 1016 to another forward cycle loop 1010 customer may maximize yield for the customer, as compared to alternative options, such as component sales via the disposal loop 1030. It should be understood that the system 20 is configured to not only apply general business rules in this process, but also to account for one or more customer-defined parameters, so as to provide a customer "outcome-based" service cycle management infrastructure.

In the context of the above-described service cycle supply chain network 1000 and the associated yield management system 20, both as described elsewhere herein, the conservation of resources remains a central driver, both with respect to maximizes economic and efficiency parameters and also with respect to maximizing yield realized—whether from an internal (e.g., by the carrier) perspective, an external (e.g., by one or more parties or entities associated with the carrier, such as a shipper or consignor) perspective, or a consolidated perspective. In certain embodiments, the consolidated perspective may take into consideration and account for (e.g., via the analysis module 500) described elsewhere herein) yield (and/or additional parameters) so as to balance conservation efforts, so as to minimize or otherwise reduce or eliminate ecological impacts resulting from logistics-related activities.

According to various embodiments, in addition to taking into consideration and accounting for yield (and/or other additional parameters), a single conservation logistics index (see FIGS. 14-16) may be generated. In certain embodiments, such may be configured to measure the combined consumption (i.e., the ecological impact) of energy and water and natural resources during the course of typical or routine logistics activities. Such may be simulated in some embodiments, while in other embodiments the activities may be based upon existing or actual data and/or some combination of actual and simulated data.

The indices of FIGS. 14-16 are configured in certain embodiments to measure the combined consumption of energy and water and natural resources. In other embodiments, however, different and/or additional consumption measurements may be tracked and/or otherwise recorded. In those embodiments involving energy, water, and natural resources, which represent generally the three largest areas of consumption, the presently described configuration—by measuring all three eco-impact areas in a single index—and/or by balancing our impact inside the logistics (e.g., carrier) provider system with an impact outside the logistics or carrier provider system, provides an authentic neutrality strategy and/or implementation plan. Where a consolidated index is desired—accounting for both the internal and external consumption, such may be generated (i.e., via execution of the modules 500-700 described herein or otherwise) as illustrated in FIG. 16. Where focus is desired either solely internally (i.e., within a carrier or logistics provider) or solely externally (i.e., relative to shippers or other clients of the carrier or logistics provider), respective indices may also be (or may alternatively be) generated, as illustrated in FIGS. 14-15. According to various embodiments, however, it should be understood that all such indices are configured across a uniform scale, as described further below, such that comparisons relative to one another may be made in a seamless fashion.

Beyond the configuration according to various embodiments wherein measurements of at least three eco-impact areas is consolidated into a single uniform index, certain embodiments may also measure comparisons between the internal and externally-focused indices. In still other embodiments, comparisons may be made and calculations may be performed further incorporating a time element, so as to evaluate progress made over time with respect to an implemented conservation plan or strategy. Such may, as a non-limiting example, be determined and/or represented by a balancing equation such as the following:

$$LP(\text{energy+water+resources}) \leq \Delta LP\_\text{Customer}(\text{energy+water+resources})$$

where LP=the logistics provider and if the logistics provider's impact externally (e.g., with its customers) (in terms of customer consumption retraction or reduction) can be manipulated to match or equal the logistic provider's internal impact, an effectively neutralized ecological impact is provide. Still further, where the external impact (in terms of customer consumption retraction or reduction) is manipulated to exceed the internal impact of the logistics provider, the logistics provider is able to effectively and in an at least partially automated fashion (e.g., via the various embodiments of the system 20 of FIG. 1 described herein) drive and contribute to global sustainable consumption. In other words, total consumption is minimized.

According to various embodiments, the mechanisms via which global sustainable consumption is achieved are those within the service cycle supply chain network 1000 as described elsewhere herein. Where choices along the "avoid/reduce/reuse/recover/recycle/treat/dispose" pyramid (see FIG. 13) are efficiently and effectively made, at least in part to maximize yield, as described elsewhere herein, but also in part to maximize consumption conservation so as to provide a sustainable conservation logistics model, a sustainable model is created.

Such conservation or eco-impact reduction or index data is not only useful internally to the logistics provider, but also externally, as a tool to provide a more meaningful and quantifiable value proposition (QVP) when approaching new potential external partners. Not only may impacts be assessed and further tracked over time in a futuristic manner with existing partners (i.e., perhaps based upon actual data), but such may also be simulated and modeled for new potential external partners, so as to provide a quantifiable value proposition (QVP) to the potential partner at the time of approach. In this context, according to certain embodiments, benchmarks may be established, for example, such that the logistics provider guarantees or otherwise enters into an obligation (e.g., a contract) to provide a certain degree of consumption retraction or reduction for the potential partner upon solidification of the partnership.

With this in mind, it is useful to consider each of FIGS. 14-16 in turn. As previously noted, FIG. 14 illustrates an exemplary uniform internal conservation logistics index 1400 according to various embodiments utilizing the network 1000 of FIG. 13. FIG. 15 illustrates an exemplary uniform external conservation logistics index 1500 according to various embodiments utilizing the network 1000 of FIG. 13. And lastly, FIG. 16 illustrates an exemplary uniform consolidated conservation logistics index 1600 according to various embodiments utilizing the network 1000 of FIG. 13. The difference between each of the indices of FIGS. 14-16 is that that of FIG. 14 considers or otherwise analyzes only conservation data internal to the logistics provider or carrier, while that of FIG. 15 only considers or otherwise analyzes just that data which is external to the logistics provider or carrier (i.e., data associated with customers of the carrier, as a non-limiting example, a consignor or shipper of a plurality of packages via the carrier).

The index in FIG. 16 combines the data upon which FIGS. 14 and 15 based, so as to, in certain embodiments, provide a consolidated index, conveying the combined impact that a carrier and its customers (e.g., consignors and the like) may have upon implementation of conservation-related initiatives. In other embodiments, such consolidated data may be otherwise displayed, for example as a balancing equation, such that a desirable perspective of benefit or advantage can be communicated, whether to or by the carrier or logistics provider.

Turning now to FIG. 16 in particular, noting that the disclosure here following and relative to the details of the scaling and/or coding of the consolidated conservation logistics index 1600 applies equally to the indices 1400 and 1500 of FIGS. 14 and 15, respectively. As may be seen in FIG. 16, a conservation rating or value or index value (all collectively referring to the same output of calculations described herein)

may be displayed on a scale, which in at least the illustrated embodiment ranges from >0 to 99. Alternative scales, may of course, be used in other embodiments, for example a scale from 1 to 10 or 0 to 9 or the like. In certain embodiments the scale may start at 0 or 1; in other embodiments, the scale may not be so limited to integer values and instead start at any value >0 (e.g., 0.1 or 0.01 or 0.0000000001, however, as may be desirable).

According to various embodiments, sub-sections may be identified within the totality of the scale. For example, with continued reference to FIG. 16, textual categories may be sequentially identified, relative to an increasing degree (left to right) of severity, as very light ("very lt"), very light to light ("very lt to lt"), light ("lt"), light to moderate ("Lt to Mod"), moderate ("Mod"), moderate to severe ("Mod to Sev"), severe ("Sev"), severe to extreme ("Sev to Ex"), extreme ("Ex"), and more than extreme ("Ex Plus"). Additional and/or alternative textual-based ratings may be provided, without departing the scope of the present invention, provided an increasing scale of intensity is recognizable there-across.

As FIG. 16 also illustrates, color-coding may also be utilized, whether in addition to or as an alternative to the textual-based ratings described above. Exemplary index ranges, as illustrated, may include light blue for >0 to 9, dark blue for 10 to 19, light green for 20-29, dark green for 30-39, yellow for 40-49, orange for 50-59, pink for 60-69, red for 70 to 79, maroon for 80 to 89, and black for 90 to 99. The numerical scale may be similarly (or otherwise) likewise (or alternatively) tied to the textual-based ratings, as follows, according to various embodiments. As a non-limiting example, the index ranges may be correlated such that Very Lt equates to >0 to 9, Very Lt to Lt equates to 10 to 19, Lt to Mod equates to 30-39, Mod equates to 40-49, Mod to Sev equates to 50-59, Sev equates to 60-69, Sev to Ex equates to 70-79, Ex equates to 80-89, and Ex Plus equates to 90-99. In certain embodiments all three combinations of descriptors for the index or scale and/or for ranges set there-within may be utilized; in other embodiments only one descriptor may be utilized or only a combination of a subset thereof.

The index rating or value associated with FIGS. 14-16 may be further, according to various embodiments, transmitted to one or more users of the system for further viewing, assessment, and/or analysis. Still further, where such index ratings may be communicated to one or more users of the system 20, different descriptors may be utilized based upon any combination of the identity of the recipient and the nature of the device upon which the data will be received. For example, color-coding indicators may be transmitted to certain devices, while not others, such as a mobile telephone, where in some instances color-coding may not be readily accessible or readable. Such decisions may be implemented via the modular configuration (e.g., modules 400-700) described elsewhere herein. Indeed, it should be understood that any combination of such modules 400-700 may be configured to perform the conservation logistics considerations, particularly including the determination and/or calculation of an index value therefor as described herein.

A comprehensive conservation logistics example is informative, with reference to FIG. 17. As may be seen therein, via a higher quality and integrated solution (as provided via the system 20 described herein), a logistics provider or carrier is able to reduce its consumption of resources, improve its value recovery, and reduce the indirect cost effort required to manage its network 1700 (including the carrier, shipper, customers (e.g., schools), and third parties). An extended product life is provided, as the school or customer has to buy fewer laptops/PCs/printers to support their high tech offering. This reduced procurement because of extended product life is a retracted footprint that translates into a reduction in consumption and/or an eco-footprint reduction for the school/customer. An improved value recovery is also provided, as an improved quality of extended life products means that the logistics provider or carrier is able to sell obsolete equipment into one or more secondary markets (e.g., to a third party) at a higher recovery rate. This benefit drives/reinforces conservation behavior within the carrier, while also influencing external consumption.

Thus, via the Conservation Logistics configuration and system described herein, calculations may be performed to determine the customer or the shipper's eco-impact index before implementation (or simulation) and also their eco-index after implementation (or simulation) (as may be represented along any one of the scales or consolidated indices of FIGS. 14-16). The goal would be for the logistics provider and/or carrier to set network-wide annual (or quarterly or otherwise periodic) goals for moving the consolidated index in a positive direction (i.e., to a lower value on the index, for example, of FIG. 16). Still further, goals may be established by the logistics provider or carrier for management and/or movement of a system-wide index (e.g., a further compiled index accounting for all of customer or shipper indices relative to the logistics provider's index—as compared to alternative indices which may compare on a one-to-one basis as between a single customer or shipper and the logistics provider. Such goals may be documented and/or distributed in corresponding reports, which may as a non-limiting example form a centerpiece of one or more sustainable initiatives or conservation movements.

Still further, implementing integrated forward, reverse, and disposal solutions for customers so as to not only maximize or improve their realized yield but to also provide a consolidated conservation of resources (i.e., via a net reduction in internal and external (relative to the carrier) consumption) will facilitate business growth for the carrier and/or others within the network and/or using the systems described herein. Ultimately, succeeding in moving the index (see, for example those indices illustrated in FIG. 14-16) in the right (i.e., desired) direction means that the logistics provider is positioned to effectively derive "Sustainable Global Consumption," as is a central goal of conservation logistics, as described herein.

Although not detailed extensively herein, as has been briefly mentioned previously herein, any one or more of the modules 400-700 of the system 20 described herein may be configured and/or utilized to execute one or more of the steps necessary to perform the calculations, comparisons, and implementations of the conservation logistics system further described herein. In this sense, the functionality thereof may be in certain embodiments interchangeable; in other embodiments a consolidated configuration may be further provided, wherein calculation of maximized yield is interrelated with calculation of a conservation index value, as both influence one another, again as detailed elsewhere herein.

CONCLUSION

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A yield management system for dynamically enhancing visibility of yield rates realized for one or more recovered assets or commodity items upon disposition thereof, said system comprising:
    one or more memory storage areas containing market data identifying one or more market yield rates for various recovered assets or commodity items; and
    one or more computer processors configured to:
    (A) receive input data associated with said one or more holders of said one or more recovered assets or commodity items and comprising at least an initial value, a selected disposition activity, and a disposition value of said one or more assets or commodity items;
    (B) retrieve disposition data associated with a plurality of disposition activities including the selected disposition activity to be undertaken with handling and processing of said one or more recovered assets or commodity items for disposal thereof, the retrieved disposition data comprising at least one component of disposition cost;
    (C) calculate a yield rate for each of said one or more recovered assets or commodity items, said calculation being based at least in part upon said selected disposition activity, said initial value, said disposition value, and said disposition cost data;
    (D) calculate whether said calculated yield rate exceeds a predetermined threshold relative to said one or more market yield rates;
    (E) responsive to said threshold being exceeded, determine yield rates for each of said one or more recovered assets or commodity items based at least in part upon the retrieved disposition data associated with the plurality of disposition activities other than the selected disposition activity;
    (F) calculate whether any of the determined yield rates for any of the plurality of disposition activities other than the selected disposition activity do not exceed the predetermined threshold;
    (G) responsive to at least one of the determined yield rates not exceeding the predetermined threshold, generate and transmit, over a distributed network and to a user interface accessible by at least one remote user of the system, an indication of the exceeded threshold for the selected disposition activity and an indication of extracted data related to the at least one of the plurality of disposition activities other than that selected that does not exceed the predetermined threshold: and
    (H) responsive to an input received, via the user interface, from the at least one remote user of said system, and via transmission over the distributed network, said input selecting an optimal one of said plurality of disposition activities other than that originally selected, automatically generate and execute machine-readable instructions configured to automatically implement updated handling of said one or more recovered assets or commodity items via the selected optimal disposition activity.

2. The system of claim 1, wherein indication comprises at least one of a report or an alert indicative thereof.

3. The system of claim 2, wherein said at least one of said report or said alert are automatically transmitted to at least one user of said system based at least in part upon predetermined rules.

4. The system of claim 2, wherein said indication comprises at least said report and said report comprises a graphical chart.

5. The system of claim 4, wherein said graphical chart includes at least one "traffic-light" type depiction, said depiction being representative of a performance level of said calculated yield rate relative to said one or more market yield rates.

6. The system of claim 1, wherein said one or more computer processors are further configured to execute a simulation tool based at least upon said calculated yield rate.

7. The system of claim 6, wherein said simulation tool is configured to generate a graphical chart.

8. The system of claim 1, wherein said one or more computer processors are further to determine a consolidated index rating on a conservation logistics index, said consolidated index being based at least in part upon a consignor consumption level and a carrier consumption level.

9. The system of claim 8, wherein said consignor and carrier consumption levels are based upon consumption data for energy, water, and natural resources.

10. The system of claim 8, wherein:
    said consolidated index rating is based at least in part upon a comparison of said consignor and said carrier consumption levels.

11. The system of claim 8, wherein said consolidated index rating is, upon generation thereof, displayed at least one of as a textual scale, as a numerical scale, or as a color-coded scale.

12. The system of claim 6, wherein said consolidated index rating is further transmitted to at least one user of said system.

13. The system of claim 2, wherein said alert is transmitted to said one or more users of said system automatically and based at least in part upon one or more rules or parameters defined by said one or more users.

14. The system of claim 13, wherein said alert is at least one of an audible alert, a visual alert, a textual alert, or a combination thereof.

15. A computer-implemented method for dynamically enhancing visibility of yield rates realized for one or more recovered assets or commodity items upon disposition thereof, said method comprising the steps of:
    (A) receiving and storing within one or more memory storage areas:
        (i) market data identifying one or more market yield rates for various recovered assets or commodity items;
        (ii) input data associated with said one or more holders of said one or more recovered assets or commodity items and comprising at least an initial value, a selected disposition activity, and a disposition value of said one or more assets or commodity items; and
        (iii) disposition data associated with a plurality of disposition activities including the selected disposition activity to be undertaken with handling and processing of said one or more recovered assets or commodity items for disposal thereof, the retrieved disposition data comprising at least one component of disposition cost;
    (B) calculating, via at least one computer processor, a yield rate for each of said one or more recovered assets or commodity items, said calculation being based at least in part upon said selected disposition activity, said initial value, said disposition value, and said disposition cost data;

(C) calculating, via the at least one computer processor, whether said calculated yield rate exceeds a predetermined threshold relative to said one or more market yield rates;

(D) responsive to said threshold being exceeded, determining, via the at least one computer processor, yield rates for each of said one or more recovered assets or commodity items based at least in part upon the retrieved disposition data associated with the plurality of disposition activities other than the selected disposition activity;

(E) calculating, via the at least one computer processor, whether any of the determined yield rates for any of the plurality of disposition activities other than the selected disposition activity do not exceed the predetermined threshold;

(F) responsive to at least one of the determined yield rates not exceeding the predetermined threshold, generating and transmitting, via the at least one computer processor, over a distributed network and to a user interface accessible by at least one remote user, an indication of the exceeded threshold for the selected disposition activity and an indication of the at least one of the plurality of disposition activities other than that selected to the at least one remote user of said system; and (G) responsive to an input received, via the user interface from the at least one remote user of said system, and via transmission over the distributed network, said input selecting an optimal one of said plurality of disposition activities other than that originally selected, automatically generating and executing, via the at least one computer processor, machine-readable instructions configured to automatically implement updated handling of said one or more recovered assets or commodity items via the selected optimal disposition activity.

16. The computer-implemented method of claim 15, wherein said indication comprises at least said report and said report comprises a graphical chart.

17. The computer-implemented method of claim 16, wherein said graphical chart includes at least one "traffic-light" type depiction, said depiction being representative of a performance level of said calculated yield rate relative to said one or more market yield rates.

18. The computer-implemented method of claim 15, further comprising the step of executing, via the at least one computer processor, a simulation tool, said simulation tool being configured to generate simulation data based at least in part upon said calculated yield rate and one or more pre-determined business models.

19. The computer-implemented method of claim 15, further comprising the step of, via said at least one computer processor, determining a consolidated index rating on a conservation logistics index, said consolidated index being based at least in part upon a consignor consumption level and a carrier consumption level.

20. The computer-implemented method of claim 19, wherein:
said consignor and carrier consumption levels are based upon a combination of consumption data for at least energy, water, and natural resources; and
said consolidated index rating is based at least in part upon a comparison of said consignor and said carrier consumption levels.

21. The computer-implemented method of claim 19, wherein said consolidated index rating is, upon generation thereof, displayed at least one of as a textual scale, as a numerical scale, or as a color-coded scale.

22. A non-transitory computer program product comprising at least one computer-readable storage medium having computer-readable program code portions embodied therein, the computer-readable program code portions comprising one or more executable portions configured for:

(A) receiving a plurality of data, wherein said data comprises:
(i) market data identifying one or more market yield rates for various recovered assets or commodity items;
(ii) input data associated with said one or more holders of said one or more recovered assets or commodity items and comprising at least an initial value, a selected disposition activity, and a disposition value of said one or more assets or commodity items; and
(iii) disposition data associated with a plurality of disposition activities including the selected disposition activity to be undertaken with handling and processing of said one or more recovered assets or commodity items for disposal thereof, the retrieved disposition data comprising at least one component of disposition cost;

(B) calculating a yield rate for each of said one or more recovered assets or commodity items, said calculation includes calculating a recovery rate for the one or more recovered assets, said calculation being based at least in part upon said selected disposition activity, said initial value, said disposition value, and said disposition cost data;

(C) calculate whether said calculated yield rate exceeds a predetermined threshold relative to said one or more market yield rates by at least determining whether the recovery rate exceeds a predetermined recovery rate threshold;

(D) responsive to said threshold being exceeded, determining yield rates for each of said one or more recovered assets or commodity items based at least in part upon the retrieved disposition data associated with the plurality of disposition activities other than the selected disposition activity, said determining yield rates includes determining a recovery rate for the one or more recovered assets;

(E) calculating whether any of the determined yield rates for any of the plurality of disposition activities other than the selected disposition activity do not exceed the predetermined threshold;

(F) responsive to at least one of the determined yield rates not exceeding the predetermined threshold, generating and transmitting, over a distributed network and to a user interface accessible by at least one remote user, an indication of the exceeded threshold for the selected disposition activity and an indication of the at least one of the plurality of disposition activities other than that selected that does not exceed the predetermined threshold; and (G) responsive to an input received, via the user interface, from the at least one remote user of said system, and via transmission over the distributed network, said input selecting an optimal one of said plurality of disposition activities other than that originally selected, automatically generating and executing machine-readable instructions configured to automatically implement updated handling of said one or more recovered assets or commodity items via the selected optimal disposition activity.

* * * * *

UNITED STATES PATENT AND TRADEMARK OFFICE
CERTIFICATE OF CORRECTION

PATENT NO. : 10,121,161 B2
APPLICATION NO. : 14/568756
DATED : November 6, 2018
INVENTOR(S) : Carrie Parris Page 1 of 1

It is certified that error appears in the above-identified patent and that said Letters Patent is hereby corrected as shown below:

Column 10, Line 02: Please remove "FIG. 5)" and replace with --FIG. 5).--.
Column 28, Line 44: Please remove "that that" and replace with --that--.
Column 30, Line 43: Please remove "FIG." and replace with --FIGS.--.
Column 31, Line 55: In Claim 1, please remove "threshold: and" and replace with --threshold; and--.

Signed and Sealed this
Twenty-fifth Day of December, 2018

Andrei Iancu
*Director of the United States Patent and Trademark Office*